United States Patent
Kotha et al.

(10) Patent No.: US 7,164,679 B2
(45) Date of Patent: Jan. 16, 2007

(54) SCALABLE ABSTRACTION OF TOPOLOGY ACROSS DOMAIN BOUNDARIES

(75) Inventors: Saikrishna M. Kotha, San Jose, CA (US); Lyndon Y. Ong, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/961,229

(22) Filed: Oct. 12, 2004

(65) Prior Publication Data

US 2005/0152284 A1     Jul. 14, 2005

Related U.S. Application Data

(60) Provisional application No. 60/535,550, filed on Jan. 12, 2004.

(51) Int. Cl.
 *H04L 12/28* (2006.01)
(52) U.S. Cl. ........................................... 370/392
(58) Field of Classification Search ............... 709/238, 709/241, 242, 243, 244; 370/254, 351, 389, 370/392
See application file for complete search history.

(56) References Cited

U.S. PATENT DOCUMENTS

| 6,459,682 B1 * | 10/2002 | Ellesson et al. ............ 370/235 |
| 6,643,699 B1 * | 11/2003 | Liver ........................ 709/226 |
| 2004/0034702 A1 * | 2/2004 | He .............................. 709/224 |
| 2004/0081105 A1 * | 4/2004 | Shimazaki et al. ......... 370/254 |
| 2004/0184441 A1 * | 9/2004 | Wu et al. .................... 370/351 |

FOREIGN PATENT DOCUMENTS

WO     WO 00/52890     9/2000

OTHER PUBLICATIONS

Gouda et al. "Maximizable Routing Metrics". IEEE. Oct. 13-16, 1998, pp. 71-78.*
Partridge, et al., "FIRE: Flexible Intra-AS Routing Environment", IEEE Journal On Selected Areas in Communications, vol. 19, 2001.
Ong, L., "Optical Control Plane Standardization—OIF / IETF /ITU", http://www.oiforum.com/public/downloads/Ong.ppt (downloaded Jun. 15, 2004, unknown publication date).
Bernsten, et al., "Optical Inter Domain Routing Considerations", Network Working Group, http://www.ietf.org/proceedings/01dec/I-D/draft-ietf-jpo-optical-inter-domain-00.txt, May 2002.

* cited by examiner

*Primary Examiner*—Derrick Ferris
(74) *Attorney, Agent, or Firm*—McGrath, Geissler, Olds & Richardson, PLLC

(57) ABSTRACT

Methods and systems are disclosed for scalable advertising of an abstracted form of an arbitrary network of nodes and links to external nodes or networks. One or more phantom hub nodes can be used that are connected to at least one node, forming one or more virtual network topology representing the internal connectivity of the network.

30 Claims, 21 Drawing Sheets

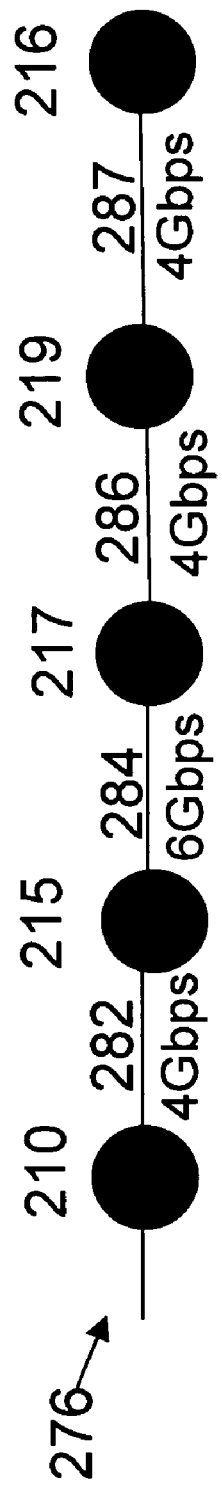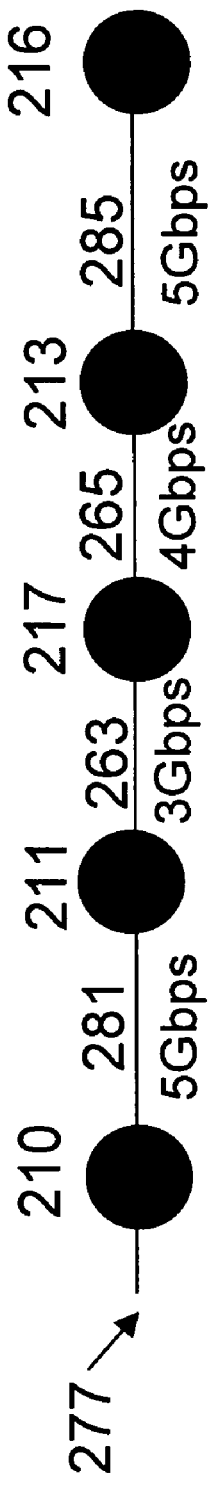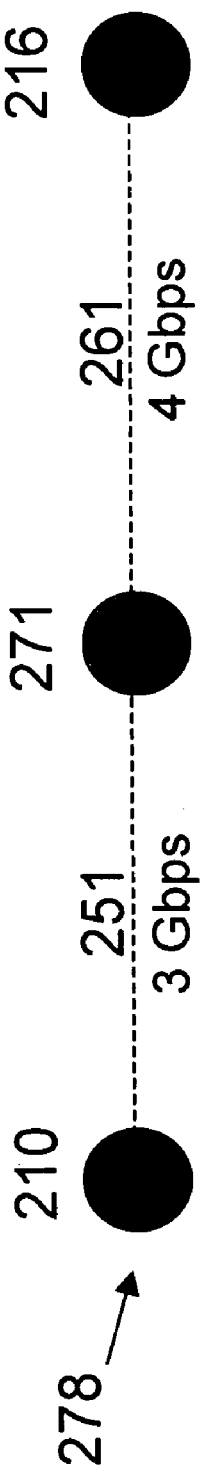

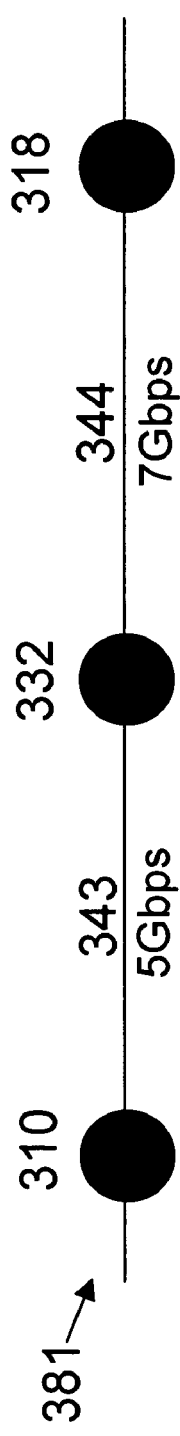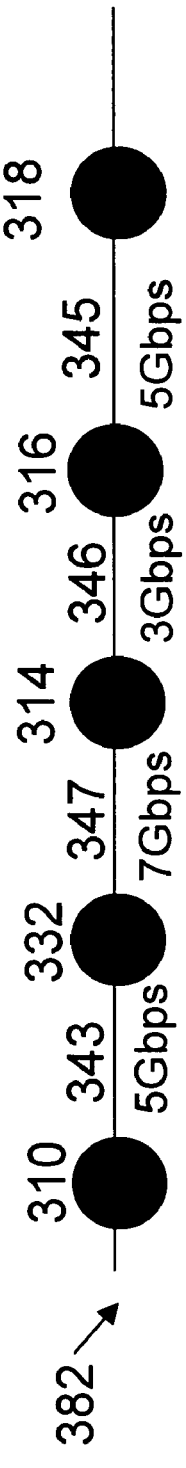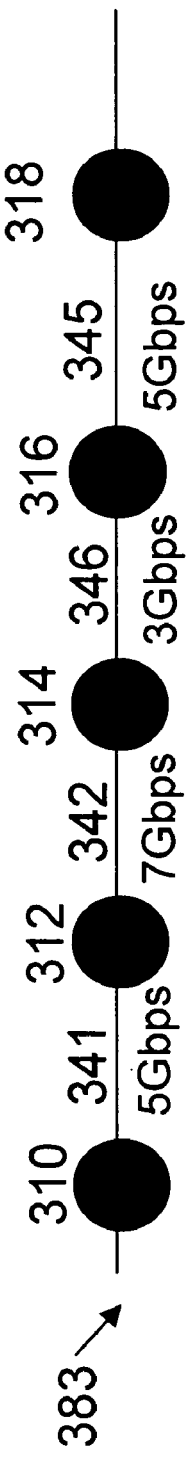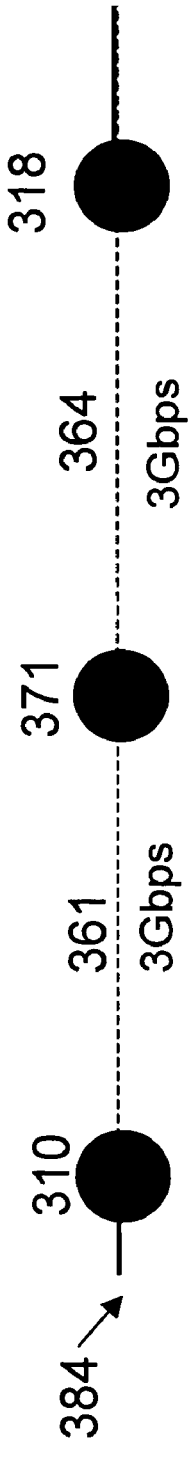

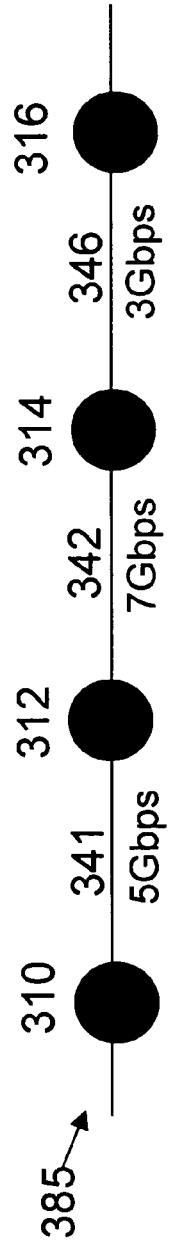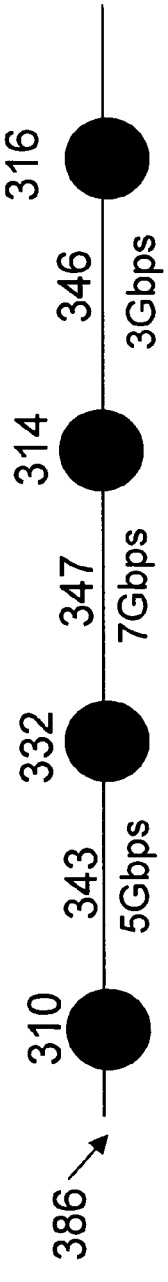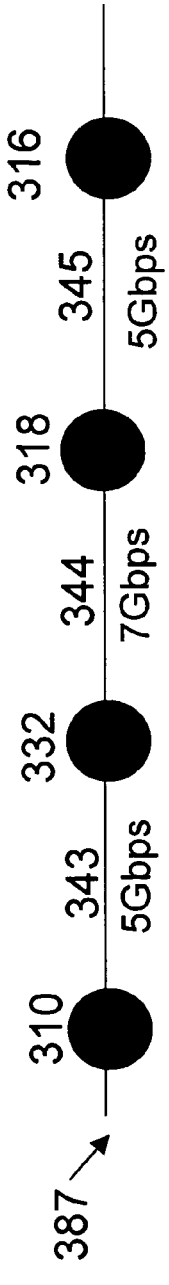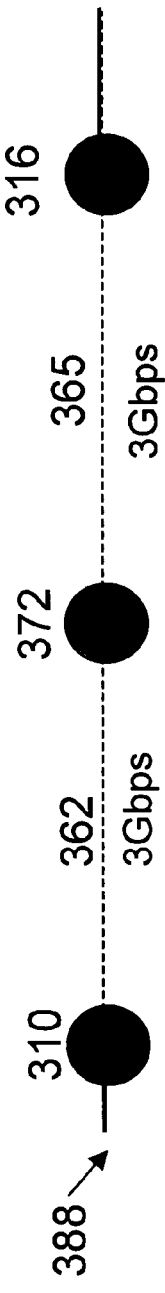

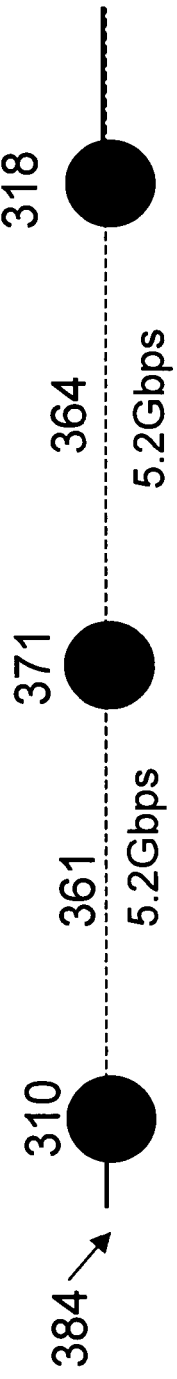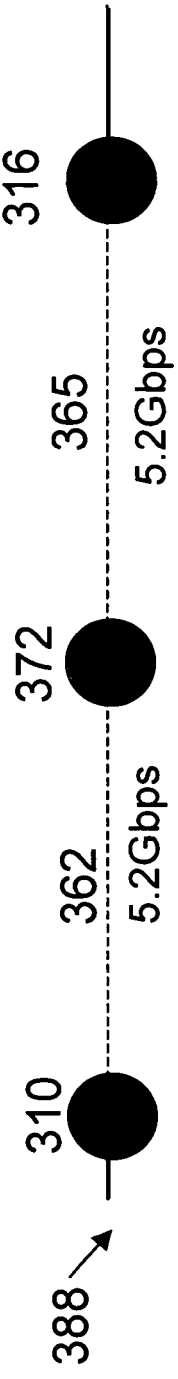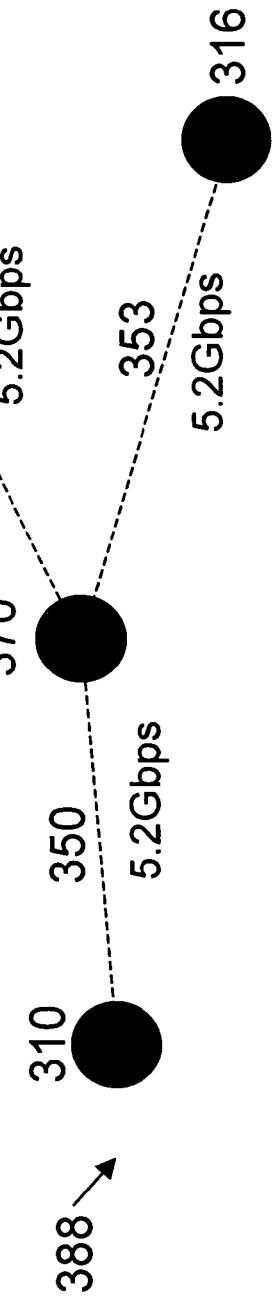
FIGURE 5A
FIGURE 5B
FIGURE 5C

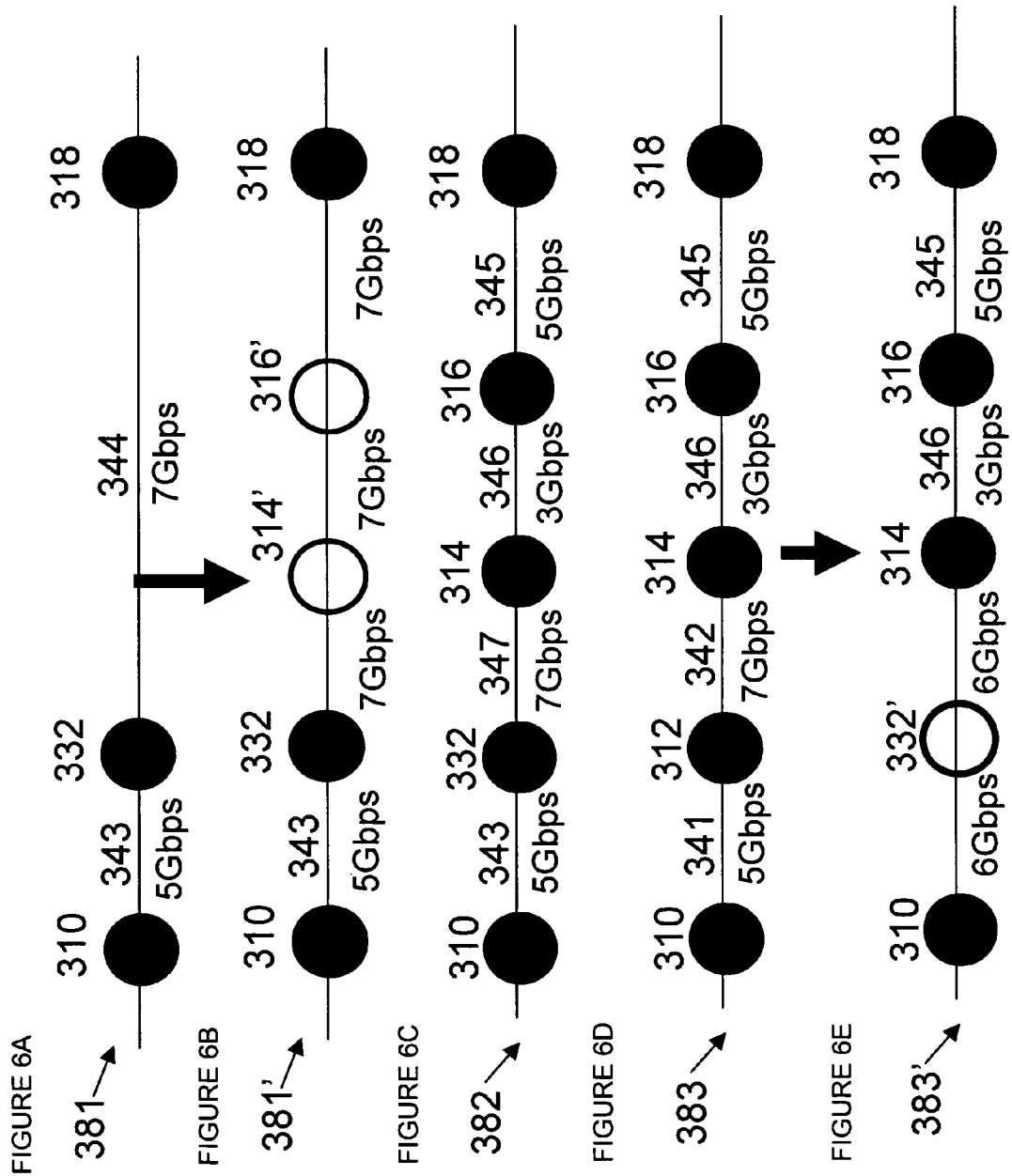

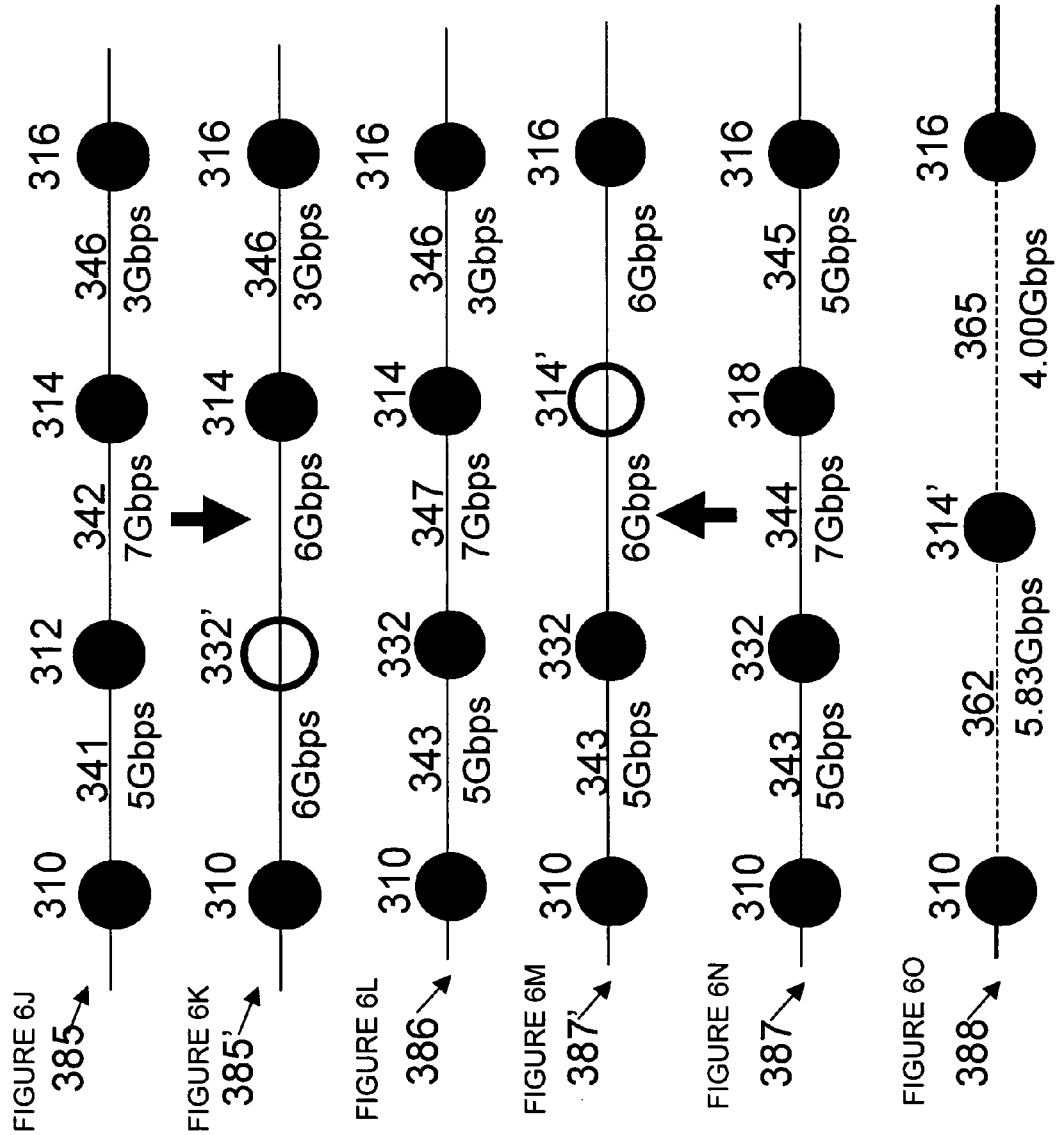

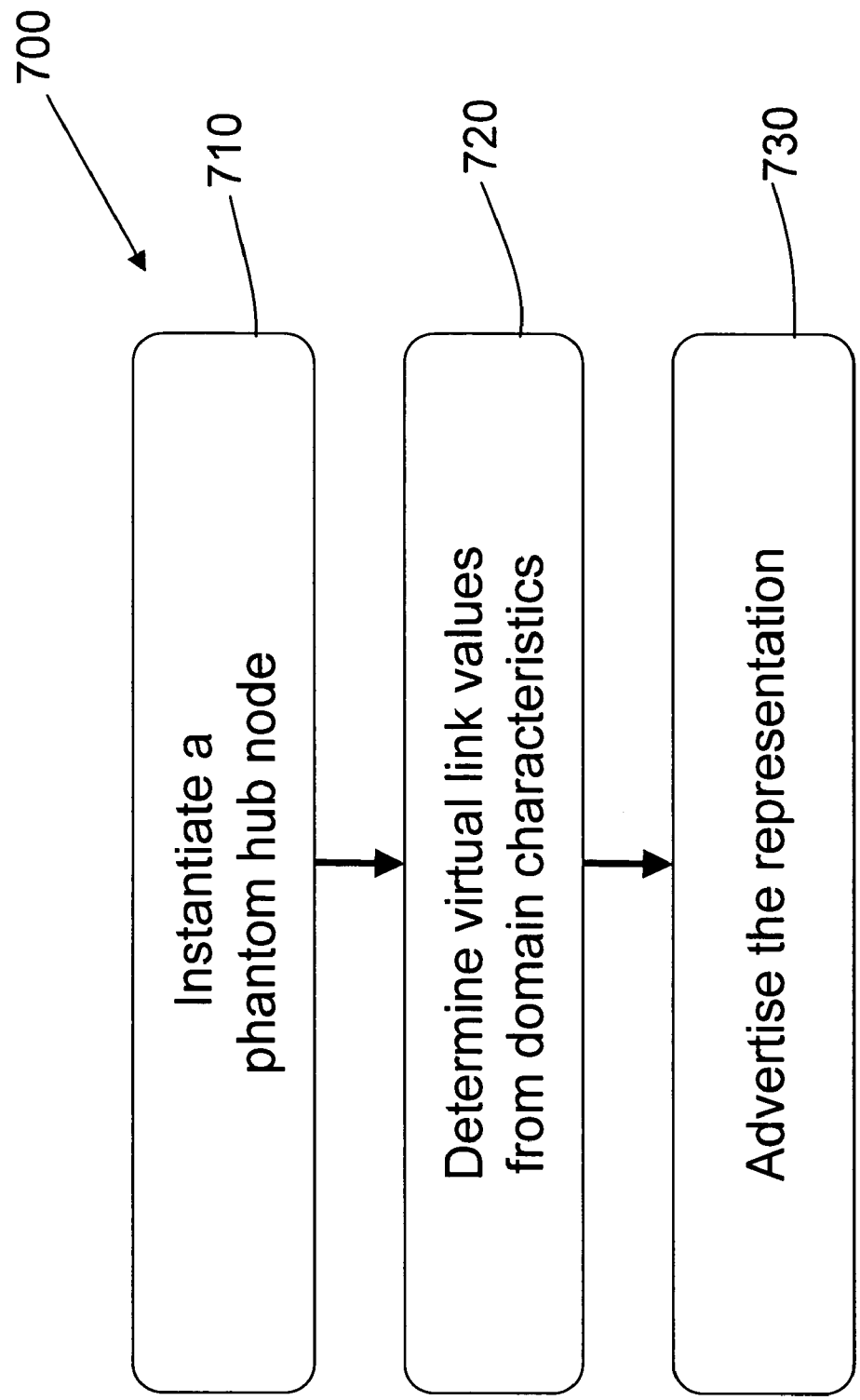

SCALABLE ABSTRACTION OF TOPOLOGY ACROSS DOMAIN BOUNDARIES

CROSS-REFERENCE TO RELATED APPLICATIONS

This application claims priority under 35 USC § 119(e) on U.S. Provisional Patent Application Ser. No. 60/535,550 filed on 12 Jan. 2004. The disclosure of which is incorporated herein by reference in its entirety.

FIELD OF THE INVENTION

The present invention generally relates to telecommunication networks more particularly the invention relates to abstraction and advertising network topologies.

BACKGROUND OF THE INVENTION

In telecommunication networks, various independent networks (domains) communicate amongst themselves. Each domain can have various internal routing protocols. Passing communications from one domain to another, across domain boundaries (through border nodes), requires the advertising of a link and node topology so that a node, originating data, can determine the appropriate path (between nodes) through which the data should be passed. The links and nodes can be advertised as a network topology, which can represent a real-time view of the status and availability of intra and inter domain connections amongst nodes using various types of advertise information, such as routing information (e.g. destination address, priority level, least-cost route, minimum route delay, minimum route distance, route congestion level, bandwidth, color, metric, and the like). Data originating nodes can use the advertised information (called routing considerations) to determine the appropriate path amongst various potential paths.

Routing protocols allow networks to dynamically adjust to changing conditions. There are several conventional routing protocols, e.g. Open Shortest Path First (OSPF), Intermediate System to Intermediate System (IS—IS) and Private Network Node Interface (PNNI) routing protocols. Conventional art systems attempt to extend these for multi-domain environments within the ITU-T (ITU-T is the telecom standardization organization of the International Telecommunication Union (ITU)).

Conventional systems use a method of abstraction for illustrating the actual internal domain topology between intra-domain border nodes and may advertise all border nodes (BN) with abstract links interconnecting them. In such a system, as the number of border nodes increases, a full mesh of abstract links is advertised. When a border node is added or removed, a full set of links connecting the border node to every other border node can be affected. In this method, if there are N−1 nodes in the network and an Nth node is added, $N^2$ links must be advertised. Thus, this system is not scalable. Further, in some circumstances, one may not want to have the actual border node intra-domain topology advertised.

Alternatively, conventional methods may advertise the domain as a single virtual node, with no internal structure. This method is simple, but has the several disadvantages. For example, interfaces need to be renumbered to be unique in the context of the single virtual node, rather than using their original interface identifiers, which are only unique in the context of the associated border node. Thus, this method is administratively more complex. Additionally, no internal restrictions or metrics can be shown for the single virtual node, since nodes are not advertised with internal properties. This means that calculation of the end-to-end metric for a connection may not be accurate since it does not take into account the cost of crossing the domain, potentially leading to inefficient routing or failure to meet end-to-end path constraints.

SUMMARY OF THE INVENTION

Exemplary embodiments provide scalable, flexible, virtual network topologies and methods of generating such virtual network topologies to support multiple interconnected networks, which can have differing structures and capabilities.

Exemplary embodiments provide for a method for scalably advertising an abstracted form a network of nodes and links (e.g. an optical network, and the like) to external nodes or networks.

Further exemplary embodiments provide for the determination of virtual links to virtual node(s) (e.g. phantom hub node(s)) using characteristics of the domain such as predetermined subscriber levels, border node characteristics, and physical link characteristics, and advertising the virtual links.

Further exemplary embodiments provide for the determination of virtual links to virtual node(s) (e.g. phantom hub node(s)) using characteristics of the intra-domain connectivity between nodes and advertising the virtual links.

Further exemplary embodiments provide a system and method using one or more internal virtual node(s) (e.g. phantom hub nodes) connected to each border node, forming at least one virtual network topology representing the internal connectivity of the network.

Additional exemplary embodiments of the invention provide systems and methods that advertise a virtual network topology (e.g. the connectivity of the advertised network, and the like) without displaying the actual detailed physical topology (domain), and supporting source routing of connections using the network in an originating, transit or destination role.

Further areas of applicability of embodiments of the invention will become apparent from the detailed description provided hereinafter. It should be understood that the detailed description and specific examples, while indicating exemplary embodiments, are intended for purposes of illustration only and are not intended to limit the scope of the invention.

BRIEF DESCRIPTION OF THE DRAWINGS

Embodiments of the invention will become more fully understood from the detailed description and the accompanying drawings, wherein:

FIGS. 2E–2G illustrate at least one other exemplary embodiment for determining virtual network topologies from actual intra-domain nodes and links;

FIGS. 4A–4K illustrate at least one exemplary embodiment for determining virtual link values to form a virtual network topology;

FIGS. 5A–5C illustrate at least one other exemplary embodiment for combining links from FIGS. 4A–4C and 4E–4G forming a virtual network topology in accordance with exemplary embodiments;

FIG. 11 illustrates a flow chart of at least one exemplary embodiment of the invention.

DETAILED DESCRIPTION

The following description of aspects of the invention is merely illustrative in nature and is in no way intended to limit the invention, its application, or uses. Aspects of the invention are disclosed in the following description and related drawings directed to specific embodiments of the invention. Alternate embodiments may be devised without departing from the spirit or the scope of the invention. Additionally, well-known elements of the invention will not be described in detail or omitted so as not to obscure the relevant details of the invention.

Figure 1:
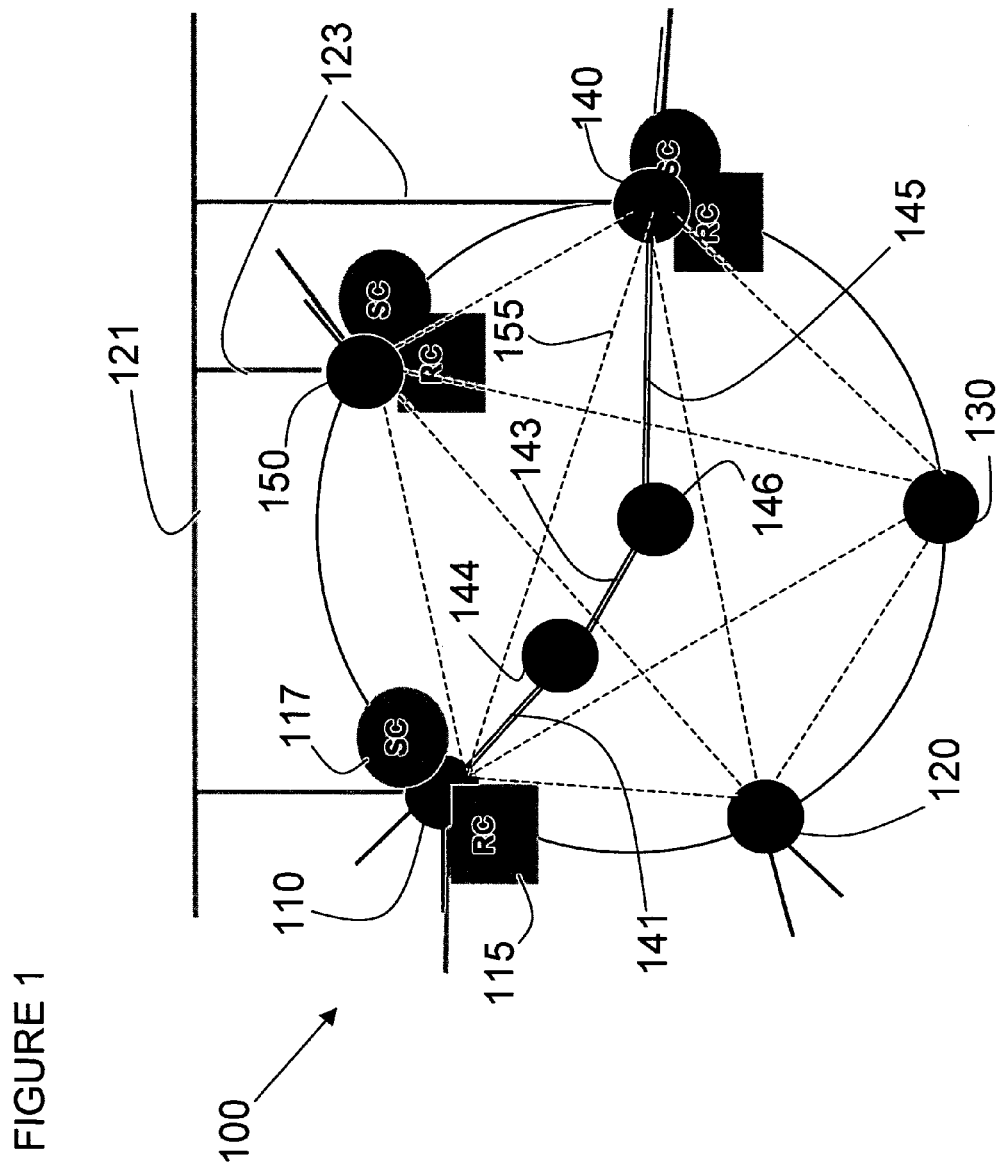
FIG. 1 is an illustration of a non-scalable method of advertising virtual links between each border node (BN)

In networks where different routing protocols need to convert their topology into a common form, conventional protocols rely on extensive processing of all the connections and systems, which can necessitate advertising all the intra-domain links amongst nodes, which tends to slow down the path computation process and requires greater memory and processing power. Additionally it is not always desirable to advertise all of the intra-domain links to external domains (e.g., one's competitors) since this provides information that may be competitively useful, e.g., where high and low traffic demands can be found. FIG. 1 illustrates a topology of an intra-domain network 100, where all the intra-domain links (e.g., 141, 143, 145) and intra-domain virtual links (e.g. 155) amongst the nodes (110, 120, 130, 140, 150, and the like) are advertised. A data originating node can use the routing information provided by the network 100, stored in a node (e.g. the border nodes (BN), other intra-domain nodes, and the like) to route data from node to node (e.g. from node 110 to node 140, through nodes 144 and 146) through intra-domain links (e.g. 141, 143, and 145) using the routing controller 115 and signal controller 117.

The network information is communicated amongst each border node (e.g. 110, 120, 130, 140, 150, and the like) using a logic control network 121 via logic control channels 123. A border node is a node that has a link between at least two domains, where a domain can be a part of a network (e.g., telecommunication network). Logic control channels 123 can carry network information rather than voice and/or data messages.

At least one exemplary embodiment does not advertise all intra-domain links between nodes. A phantom hub node is generated and it's connectivity to border nodes and other intra-domain nodes are used to construct a virtual network topology with associated information (e.g. routing information) that can be advertised. In exemplary embodiments, the information advertised contains the connectivity of border nodes with at least one phantom hub node in a first domain. This information can be advertised to other domains seeking to route data through the first domain. The virtual network topology can comprise constructed intra-domain virtual links to/from the phantom hub node, to/from intra-domain nodes, which represent the actual intra-domain links between intra-domain nodes. One virtual link can represent many intra-domain links, reducing the amount of information needed to be advertised and facilitating the addition of additional border nodes.

In at least one exemplary embodiment the characteristics of one border node is used to calculate the virtual link between that node and a phantom hub node. Each node can calculate its respective virtual link and communicate each link to each border node to form a virtual network topology. Each border node can advertise the virtual links and virtual network topology to other nodes (e.g. data originating nodes).

In at least one other exemplary embodiment the characteristics of all border node(s) and links between the node(s) in the physical topology can be used to determine the virtual link between a select number of node(s) and at least one phantom hub node forming a virtual network topology. Each border node can advertise the virtual network topology (e.g. virtual link values) to other nodes (e.g. data originating nodes).

Various networks can utilize various embodiments. For example a constructed virtual network topology in accordance with at least one exemplary embodiment can be used to support virtual private network (VPN) services (where a particular customer gets connectivity only between their locations using some pre-defined subset of network resources). The VPN can be instantiated as a phantom hub node connecting border nodes that can connect to VPN customer sites, with the virtual link capacity set initially based on the service agreement with the VPN customer and thereafter updated to reflect that customer's usage of network resources. This provides the VPN customer with a simple virtual topology that they can access that still describes the connectivity and resources available to them. Accordingly, in further exemplary embodiments the virtual links connecting the phantom hub nodes to the intra-domain nodes can be established using predetermined virtual link values.

Figure 2A:
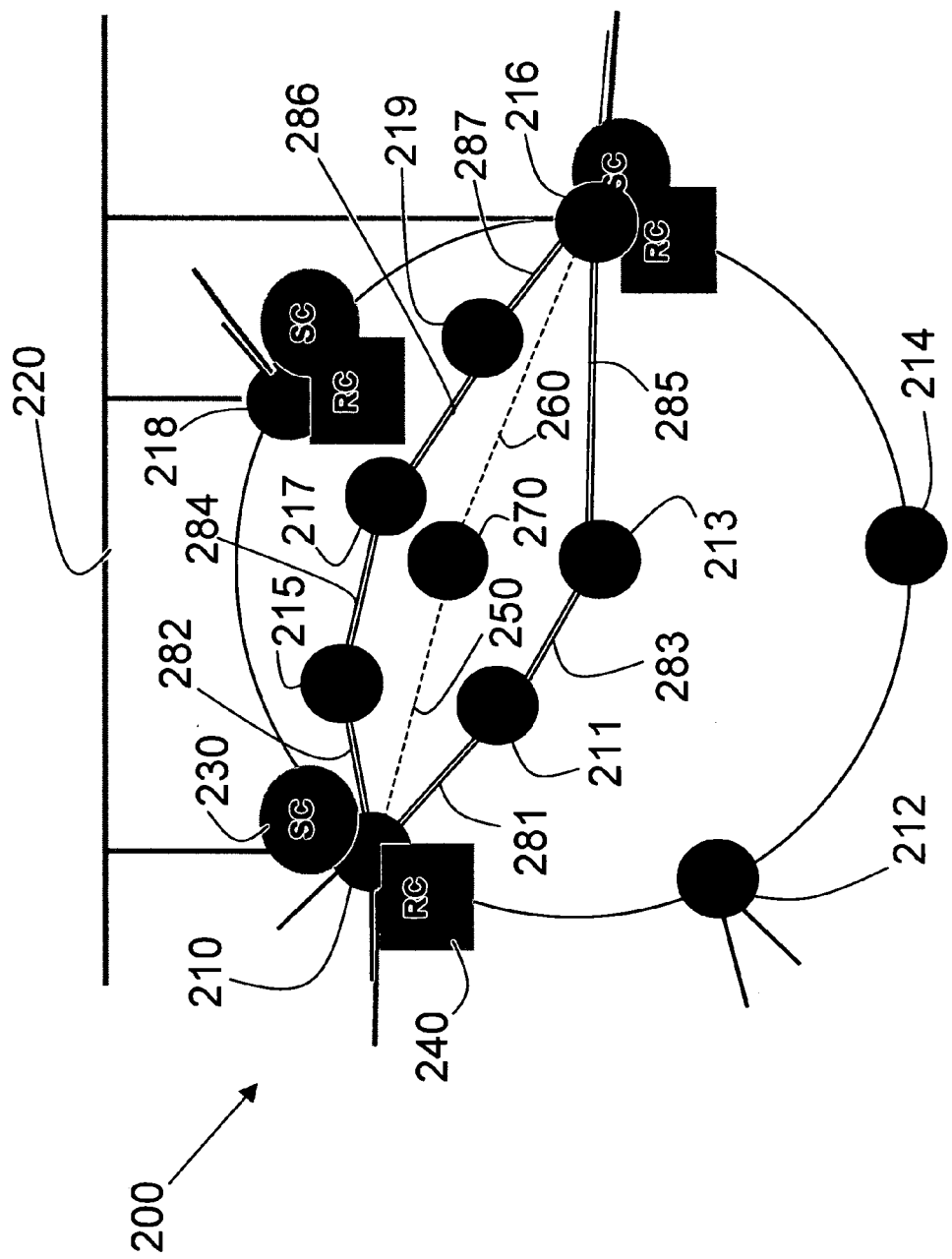
FIG. 2A is an illustration of a virtual network topology having at least one phantom hub node representing actual intra-domain node(s) and links.

FIG. 2A illustrates at least one exemplary embodiment of a virtual network topology 200 for a domain. A phantom hub node 270 can be created for each domain, and virtual links 250 and 260 can be formed between BNs (e.g. 210, 212, 214, 216, and 218) and the phantom hub node 270. The instantiation of the phantom hub node 270 can be accomplished by several methods (e.g., configure or hard code a phantom hub node id, generate a phantom link state advertisement (LSA) on behalf of phantom hub node and publish the LSA, and the like). The virtual network topology advertised can include nodes (e.g. 210, 212, 214, 216, and 218, and the like), some or all of which can be border nodes, and virtual links (e.g. 250, 260, and the like) linked to phantom hub 270. The representation of actual intra-domain links by a fewer number of advertised virtual links can reduce the amount of routing information advertised and hide details of the intra-domain network topology for security purposes.

The routing controller 240 can derive the virtual network topology of the intra-domain network. For example, virtual links 250, 260 and phantom hub node 270 are a virtual representations of the physical intra-domain connectivity between intra-domain nodes, 210 and 216 through nodes 211, 213, 215, 217, and 219 via intra-domain links 281–287. Thus in at least one exemplary embodiment the routing information containing connectivity information of virtual links 250, and 260, border nodes 210 and 216, and phantom hub node 270, can be advertised without the connectivity information of the actual intra-domain network topology.

The advertised routing information of the virtual network topology (phantom LSA) between border nodes 210 and 216 via the phantom hub 270 and virtual links 250 and 260 can be determined by a several different methods. For example, the LSA for virtual links 250 and 260 may advertise the combined total bandwidth available using the two paths having links (282, 284, 286, 287) and (281, 283, 285), where the bandwidth for each path is the minimum of the bandwidth available on each link in the path. The LSA for the fully connected topology configuration in FIG. 1 may use a similar method of deriving bandwidth for virtual links, however it requires a fully meshed set of virtual links with the accompanying disadvantages for scalability, as discussed herein. Alternatively, the LSA for virtual links 250 and 260 may advertise characteristics that have been determined by policy of the carrier offering the network service (e.g. subscription levels).

Referring to FIG. 1, since all border nodes are interconnected in the network topology (domain), when adding a new ($N^{th}$) border node, each border node needs to advertise virtual and/or intra-domain links to the new border node, resulting in $N^2$ intra-domain and/or virtual link advertisements. In contrast to having to calculate all of the additional intra-domain links when adding additional border nodes, exemplary embodiments of the invention comprising a phantom hub node can the virtual link between the added border node and the phantom hub node resulting in only 2 more intra-domain advertisements when adding a new ($N^{th}$) border node. As the number of border nodes increases, the use of a phantom hub node reduces the number of virtual link advertisements needed since only the virtual link information between the added border node and the phantom hub node would be needed.

Exemplary embodiments can have the phantom hub node as a border node. Additional exemplary embodiments can contain one or more Routing Controllers (RC), which can be nodes that serve to relay advertisements from external nodes or networks into the intra-domain network, and generate advertisements of the intra-domain network topology to send to external nodes or networks. The RCs can be configured in several arrangements (e.g. centralized routing control or distributed routing control, and the like). The virtual network topology information, an example of a representation of a domain, can be communicated to each border node (210, 212, 214, 216, and 218) via the control channel 220. Additional exemplary embodiments can represent a portion of a domain instead of the whole domain.

Further exemplary embodiments can contain one or more signal controllers 230 (SC) that can change data into forms suitable (e.g. particular signaling protocols, parsing the data, amplification or modification of the data, filtering the data, forming signals from the data and the like) for the domain. Additionally the signal controller 230 can implement a signaling protocol (e.g., PNNI protocol, Optical Signaling and Routing Protocol (OSRP), and the like) that can cause the signal to be transmitted from one node to another within the domain along the route chosen by a routing protocol implemented by the routing controller 240. The signaling protocol can start sending a signal by sending a setup message through the nodes along the chosen route. Once a data destination node receives the setup message, a cross-connect signal can be sent from the data destination node back to the originating node via the same route. Once the originating node receives the cross-connect signal, a connection can be established for data exchange between the nodes.

Figure 2B:
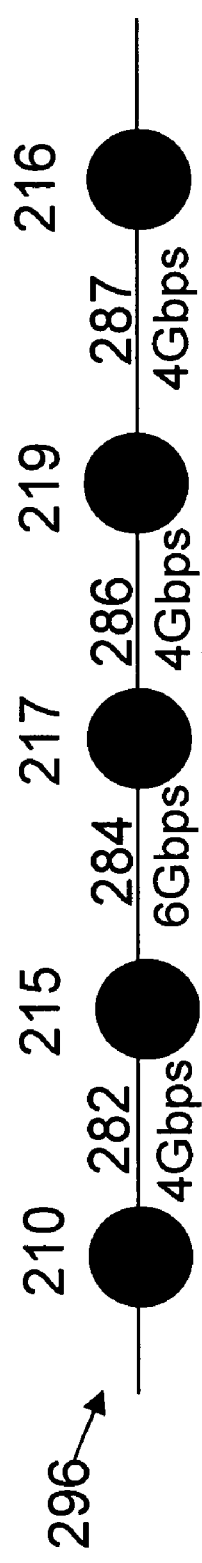
FIGS. 2B–2D illustrate at least one exemplary embodiment for determining virtual network topologies from actual intra-domain nodes and links.
Figure 2C:
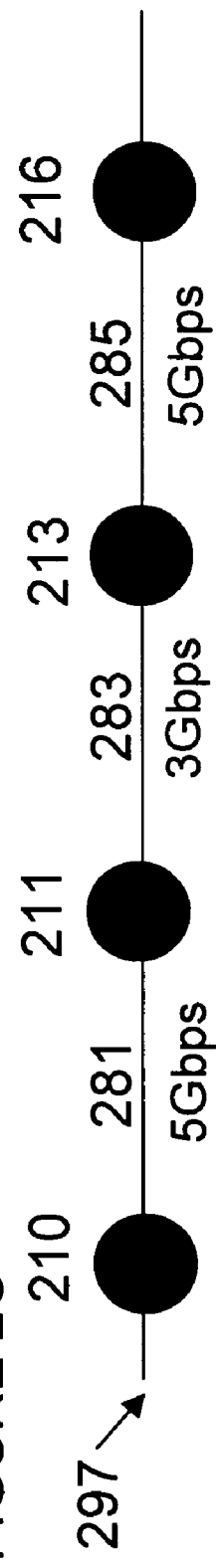
Figure 2D:
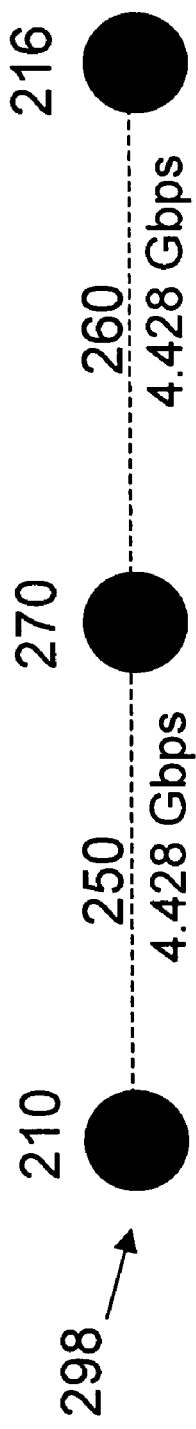

FIGS. 2B–2D illustrate the two physical intra-domain link paths of FIG. 2B, 296 and 297 corresponding respectively to the intra-domain link paths from nodes 210, 215, 217, 219, 216 through links 282, 284, 286, 287, and nodes 210, 211, 213, 216 through links 281, 283, 285. The physical intra-domain link paths 296 and 297 can be combined into a representative portion 298 of a virtual network topology. The portion 298 (virtual path) can be constructed using various methods, as discussed herein.

For example, FIG. 2B shows an example bandwidth amongst various links between the nodes shown. In the exemplary embodiment shown, links 282, 286 and 287 have bandwidths of 4 Gbps, while link 284 has a bandwidth of 6 Gbps. Likewise, FIG. 2C illustrates the various bandwidths for the various links, with 5 Gbps for links 281 and 285, and 3 Gbps for link 283. Other types of routing information can be used besides bandwidth and the discussion herein of bandwidth should not be interpreted as limitative of the routing information used to determine link values or characteristics of the virtual links 250 and 260 (e.g. link path reliability, link delay, link available capacity, link minimum reservable capacity, link metric, destination address, priority, link color, link termination capabilities and the like).

FIG. 2D illustrates at least one exemplary embodiment where the virtual path 298, is representative of the link paths 296 and 297 using an average value of the bandwidth of both link paths 296 and 297. Further exemplary embodiments can use other methods, several types of data, and computations, as discussed herein, to derive the virtual routing information for virtual path 298. Other parameters may be determined by adding metrics on the associated real links, such as in the case of link metric, or by taking the minimum of the parameter values on the associated real links, such as in the case of minimum reservable capacity (i.e., the smallest quantum of capacity that may be reserved for an individual data flow).

FIGS. 2E–2F illustrate a further example of two alternative physical intra-domain link paths 276 and 277, where node 211 is no longer connected to node 213 as in FIG. 2C but instead to node 217, and then from node 217 to 213 and to 216. Intra-domain link paths 276 and 277 correspond respectively to the intra-domain link paths from nodes 210, 215, 217, 219, 216 through links 282, 284, 286, 287, and nodes 210, 211, 217, 213, 216 through links 281, 263, 265, 285. The physical intra-domain link paths 276 and 277 can be combined into a representative portion 278 (virtual path 278) of a virtual network topology. The portion 278 can be constructed using various methods.

For example, FIG. 2E shows an example bandwidth amongst various links between the nodes shown. In the exemplary embodiment shown, links 282, 286 and 287 have bandwidths of 4 Gbps, while link 284 has a bandwidth of 6 Gbps. Likewise, the other various links have associated bandwidths, with 5 Gbps for links 281 and 285, 3 Gbps for link 263, and 4 Gbps for link 265 are illustrated (FIG. 2F). Other types of routing information can be used besides bandwidth and the discussion herein of bandwidth should not be interpreted as limitative of the routing information used to derive properties of the virtual links 251 and 261 (e.g. link path reliability, link delay, link available capacity, link minimum reservable capacity, link metric, destination address, priority, link color, link termination capabilities and the like).

FIG. 2F illustrates at least one other exemplary embodiment where the virtual path 278, is representative of the link paths 276 and 277 using the minimum value of the bandwidth of both link paths 276 and 277. Further exemplary embodiments can use other methods, several types of data, and computations, as discussed herein, to derive the virtual routing information for virtual path 278. In the exemplary embodiment shown the bandwidth for virtual link 251 is 3 Gbps, which is the minimum bandwidth of link paths 276 and 277 up to node 217. In the example shown the bandwidth for the virtual link 261 is 4 Gbps, which is the minimum bandwidth for links paths 276 and 277 from node 217 to destination node 216. In this example the phantom hub node 271 is associated with node 217.

Those skilled in the art will appreciate that the embodiments shown herein are examples only, many variations fall within the intended scope of exemplary embodiments. For example weighted averages of properties can be used, minimum properties, predetermined virtual link values and the like. Further embodiments include the possibility of there being only one physical link between two nodes that can still be represented by a virtual link value. For example if the intra-domain physical link path 297 is the only physical link path between node 210 and 216, the virtual link value can be a combination of the values along links 281, 283, and 285 using the techniques discussed for combining more than one physical link path (e.g. averaging the values, sum of the values, the minimum values, and the like), which includes using predetermined values (e.g. VPN subscription levels).

Figure 3A:
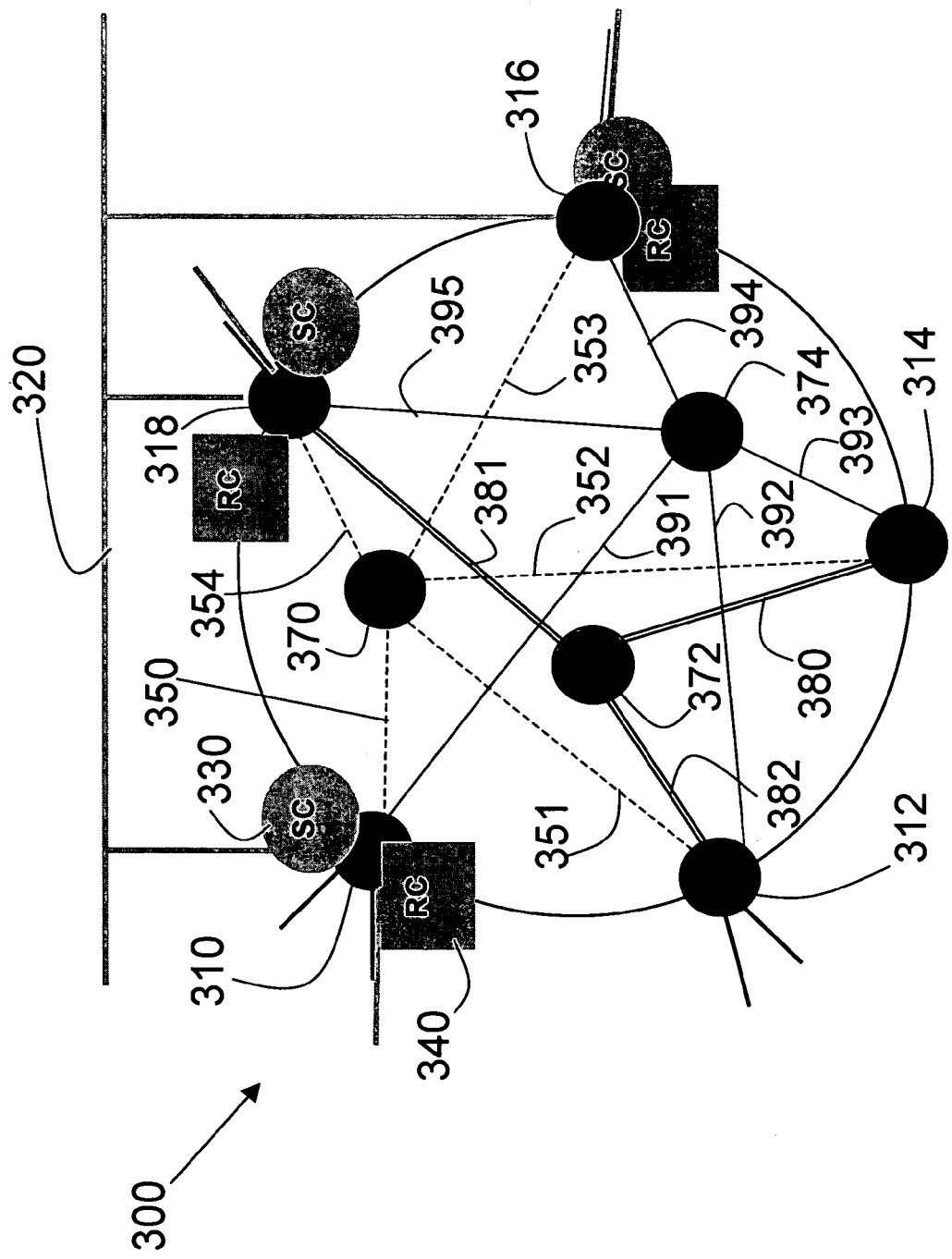
FIG. 3A is an illustration of a virtual network topology having several phantom hub nodes representing actual intra-domain node(s) and links in accordance with at least one exemplary embodiment.

FIG. 3A illustrates at least one further exemplary embodiment of a virtual network topology 300. The control channel 320 can communicate the virtual routing information for the virtual network topology 300 to the border nodes 310, 312, 314, 316, and 318. The routing controllers 340 and signal controllers 330 control the routing and signal transport through the network. The actual intra-domain connectivity remains but in at least one exemplary embodiment the advertisement of the connectivity between border nodes and actual intra-domain nodal connections and links can be replaced by the virtual network topology 300. The virtual network topology 300 shows three phantom hub nodes 370, 372, and 374, although exemplary embodiments are not limited to any particular number of phantom hub nodes. Phantom hub node 370 can be connected by virtual links 350–354 to each border node 310, 312, 314, 316, and 318 in a star connectivity pattern. Phantom hub node 374 can likewise be connected in a star connectivity pattern via virtual links 391–395 to each border node. However, phantom hub node 372 can be connected in a star connectivity pattern with only a subset of border nodes 312, 314, and 318.

Accordingly, the advertised virtual routing information for the sub virtual network topology (e.g. phantom hub node 372, virtual links 380–382, and border nodes 312, 314, and 318) can represent connectivity between some border nodes, but not necessarily all border nodes.

Other configurations of the nodes, phantom hub nodes, virtual and physical links are possible (e.g. mesh topology, hybrid topology, tree topology, and the like). Additional variations can include the number of border nodes connected to a phantom hub node, the number of phantom nodes, and whether any, all or some of the phantom hub nodes are connected to at least one or all of the border nodes. Additionally, the phantom hub node can be a physical node (e.g., a border node). These variations are within the scope of exemplary embodiments of the invention.

Figure 3B:
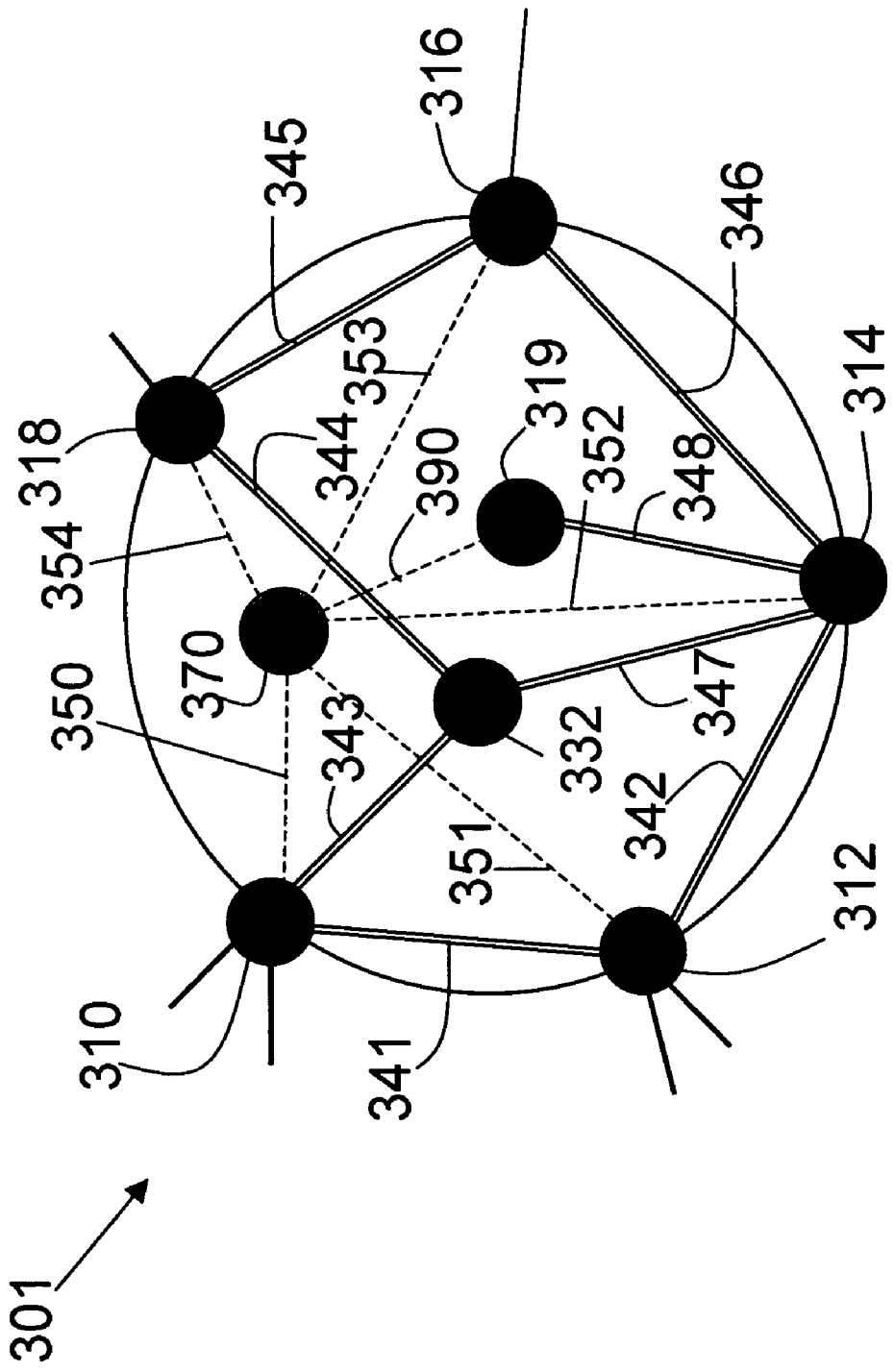
FIG. 3B illustrates an example of representation of a physical network topology by one of the virtual network topologies shown in FIG. 3A, with internal intra-domain nodes shown.

FIG. 3B illustrates an example of a physical network represented by the virtual network topology 301 with phantom hub node 370, border nodes 310, 312, 314, 316, 318, and virtual links 350–354, first shown in FIG. 3A. The physical network can have various configurations (full mesh, mesh, star, linear, ring, and the like). FIG. 3B illustrates a mesh configuration between physical nodes 310, 312, 314, 316, 318, 319, and 332, with physical links 341–348. As described above, the physical nodes and links can be represented as a virtual network topology that can be advertised. The virtual links 350–354, and phantom hub node 370 can be determined via various methods in accordance with exemplary embodiments as discussed herein.

In at least one exemplary embodiment the characteristics intra-domain physical links connecting to a border node can be used by the border node to determine virtual links to a phantom hub node. The virtual link is then communicated to other nodes (e.g. border nodes) forming a virtual network topology that can be advertised. In other exemplary embodiments only the virtual link of the border node being queried is advertised. For example the following table (Table 1) provides example bandwidth values for each link.

TABLE 1

| LINK NUMBER | LINK VALUE (Gbps) |
| --- | --- |
| 341 | 5 |
| 342 | 7 |
| 343 | 5 |
| 344 | 7 |
| 345 | 5 |
| 346 | 3 |
| 347 | 7 |

In at least one exemplary embodiment the virtual link values can be calculated by adding all the bandwidth of links connected to each border node. Thus for this particular example the virtual link values to a phantom hub node are listed in Table 2.

TABLE 2

| VIRTUAL LINK NUMBER | VIRTUAL LINK VALUE (Gbps) |
| --- | --- |
| 350 | 10 |
| 351 | 12 |
| 352 | 17 |
| 353 | 8 |
| 354 | 12 |

Each virtual link value can be communicated to each other border node and advertised to a querying node or only the virtual link value for the node queried can be advertised.

In at least one further exemplary embodiment the minimum bandwidth of links connected to each intra-domain node (e.g. border node) can be used to determine the characteristic virtual link values (Table 3).

TABLE 3

| VIRTUAL LINK NUMBER | VIRTUAL LINK VALUE (Gbps) |
|---|---|
| 350 | 5 |
| 351 | 5 |
| 352 | 3 |
| 353 | 3 |
| 354 | 5 |

The border nodes can receive the virtual link values in Table 3 and can advertise the virtual values to querying nodes. Alternatively the border nodes can receive the data of the physical topology and calculate the virtual link values, for example as discussed herein, or can just use the characteristics of the values with each border node and advertise the value of that node with respect to the phantom hub node (for example the values in Table 2).

Additionally virtual link 390 can be constructed between phantom hub node 370 and at least one intra-domain node 319 not necessarily a border node. Thus in at least one embodiment, a virtual network topology is constructed for some of the intra-domain nodes, and an outside data originating node may communicate with a border node (e.g., 314), which can include advertising to the intra-domain nodes (e.g., 319) associated with the virtual network topology. The intra-domain nodes (e.g., 319) can advertise, the virtual network topology, as if they were border nodes. For example the phantom hub node 370 could have a virtual link 390 to an intra-domain node 319 that is not a border node. The intra-domain node 319 can be connected to various other intra-domain nodes.

Other methods of determining the virtual network topology are intended to be within the scope of embodiments of the invention, for example, minimum bandwidth, color, metrics, and the like. FIGS. 4A–6R illustrate other examples of determining virtual link values in accordance with exemplary embodiments of the invention. Specifically, FIGS. 4A–6R illustrate examples of methods of determining the virtual link values (characteristics) for virtual paths 350, 353, and 354 connecting border nodes 310, 316, and 318 with phantom hub node 370. FIGS. 7A–7I illustrate still more examples of embodiments that determine virtual link values. One of ordinary skill in the arts would recognize that many further examples fail within the scope of the present invention and the examples herein are not intended to be limitative.

FIGS. 4A–4C illustrate three paths from border node 310 to 318 (note in this example all possible paths are not necessarily considered). FIG. 4A illustrates the first path 381, with nodes 310, 332, 318, through links 343 and 344 with bandwidths 5 Gbps and 7 Gbps respectfully. FIG. 4B illustrates the second path 382, with nodes 310, 332, 314, 316, 318, through links 343, 347, 346, 345 with bandwidths 5 Gbps, 7 Gbps, 3 Gbps, 5 Gbps, respectfully. FIG. 4C illustrates the third path 383, with nodes 310, 312, 314, 316, 318, through links 341, 342, 346, 345 with bandwidths 5 Gbps, 7 Gbps, 3 Gbps, 5 Gbps, respectfully. In at least one exemplary embodiment the virtual links 361 and 364, connected to intermediate phantom hub node 371, are assigned values associated with the minimum bandwidth along all three paths, 3 Gbps (FIG. 4D). Although for the example the minimum bandwidth is used, other methods (e.g. link average, weighted average, and the like) can be used. Additionally, those skilled in the art will appreciate that link values (characteristics) that are not susceptible to mathematical operations can be represented based on rules defined by the network operator.

Likewise FIGS. 4E–4G illustrates three paths from border node 310 to 316. FIG. 4E illustrates the first path 385, with nodes 310, 312, 314, 316, through links 341, 342, and 346 with bandwidths 5 Gbps, 7 Gbps, and 3 Gbps, respectfully. FIG. 4F illustrates the second path 386, with nodes 310, 332, 314, 316, through links 343, 347, 346 with bandwidths 5 Gbps, 7 Gbps, 3 Gbps, respectfully. FIG. 4G illustrates the third path 387, with nodes 310, 332, 318, 316, through links 343, 344, 345 with bandwidths 5 Gbps, 7 Gbps, 5 Gbps, respectfully. In at least one exemplary embodiment the virtual links 362 and 365, connected to intermediate phantom hub node 372, are assigned values associated with the minimum bandwidth along all three paths, 3 Gbps.

Figure 4I:
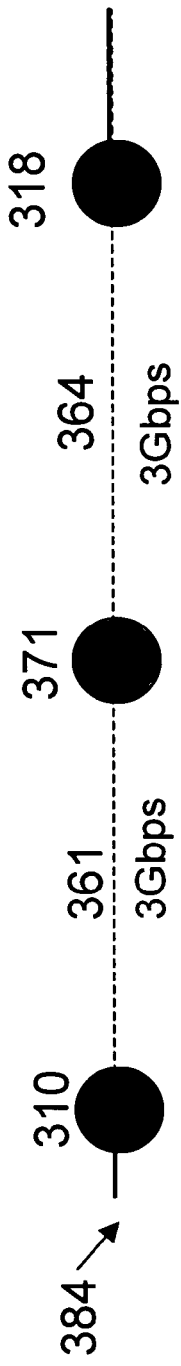
Figure 4J:
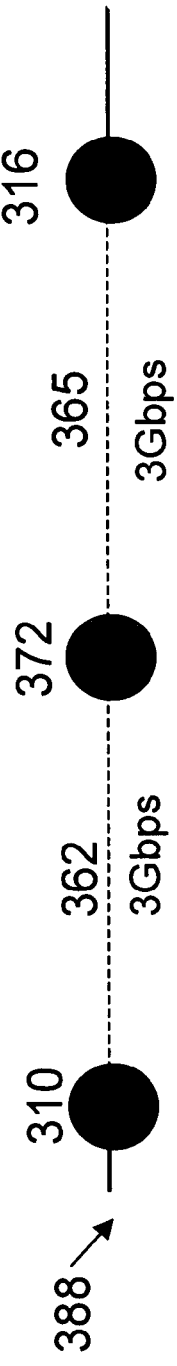
Figure 4K:
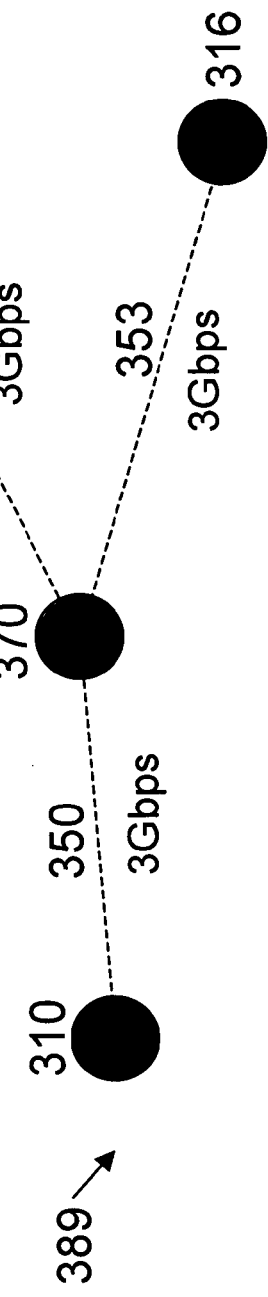

The intermediate phantom hub nodes 371 and 372 along with associated virtual links 361, 362, 364, and 365 can be combined to form the properties advertised for phantom hub node 370 and associated virtual links 350, 353, and 354 forming a virtual network topology 389 (FIGS. 4I–4K). In the example shown the minimum bandwidth of virtual links 361 and 362 is used, which happens to be the same 3 Gbps used for virtual link 350. The values (3 Gbps) of the virtual links 364 and 365 are used for the virtual links 354 and 353, respectfully. Although again the minimum bandwidth is used in the example, the maximum, average and other variations are intended to fall within the scope of exemplary embodiments. Further, embodiments of the invention do not require calculating intermediate phantom hub nodes. Instead, the values can be derived directly from the network topology information.

Additionally, FIGS. 5A–5C illustrate the result of assigning the average values of the links to their respective virtual links and phantom hub nodes. In the exemplary embodiment shown in FIGS. 5A–5C the averages happen to be equal although such a result is not required. If the values of virtual link 361 and 362 were different the value that can be assigned to virtual link 350 can be the average of the two.

In further exemplary embodiments the phantom hub node can be associated with an intra-domain node (e.g. border node). Since all possible paths may not include the intra-domain node, virtual nodes and links can be derived to obtain effective paths (e.g. 381', 383', and the like). In the example shown in FIGS. 6A–6Q, in accordance with at least one exemplary embodiment, at least one path not including the intra-domain node intended to represent the phantom hub node is included, and at least one path including the intra-domain node is included. Not all of the paths are shown or used in the determination, as this example is provided as an illustration of another method to calculate virtual link values.

For example, FIGS. 6A, 6C, and 6D, illustrate the consideration of three paths from node 310 to node 318, path 381 (FIG. 6A), path 382 (FIG. 6C), and path 383 (FIG. 6D). In this particular exemplary method, the paths that do not include the intra-domain node 314 (path 381), that is intended to represent the phantom hub node 370, are transformed into effective paths comprising a virtual node 314'. For example, the first path 381 from node 310 to 318 derived into effective path 381' containing virtual node 314' and 316'. In this example, a particular path (e.g., 382) containing the intra-domain node (e.g., 314) is chosen as the template.

The other paths are derived to contain a similar path using virtual nodes as describe herein.

In the non-limitative example shown herein, path 382 is chosen to be a template that the other paths can match. Thus effective path 381' contains nodes 310, 332, 314', 316' and 318. The second path 382 shown in FIG. 6C includes nodes 310, 332, 314, 316, 318. The third path (FIG. 6D) contains nodes 310, 312, 314, 316 and 318. FIG. 6E shows the effective path 383' having nodes and virtual nodes 310, 332', 314, 316, 318. Thus the path 382 and effective paths 381' and 383' have nodes 310, 332, 314, 316, 318 and/or virtual nodes 316', 314', and 332'. The values associated with the virtual links between nodes and virtual nodes can be derived by various techniques as discussed above. For example the virtual link values between node 310, 332' and 314 of virtual path 383' can be the average bandwidth between the nodes 310 and 314 of path 383. In this particular version of an exemplary embodiment, effective path 381' (FIG. 6B), effective path 383' (FIG. 6E), and path 382 (FIG. 6C) are used. Each path includes the same nodes or equivalent virtual nodes, simplifying the calculation of averages in this particular non-limitative case.

Figure 6F:
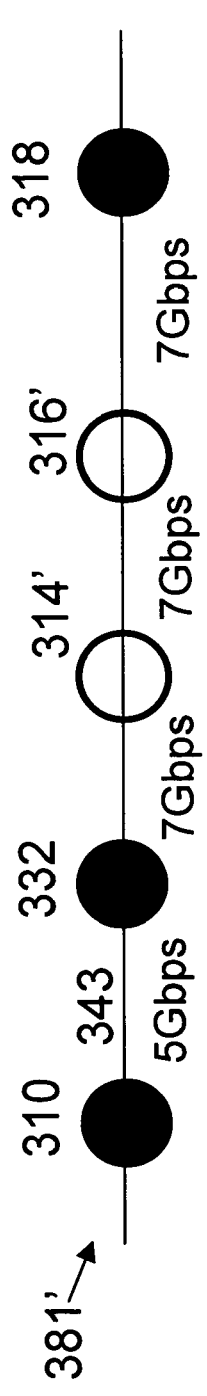
FIGS. 6A–6R illustrate at least one exemplary embodiment for determining virtual link values to form a virtual network topology.
Figure 6G:
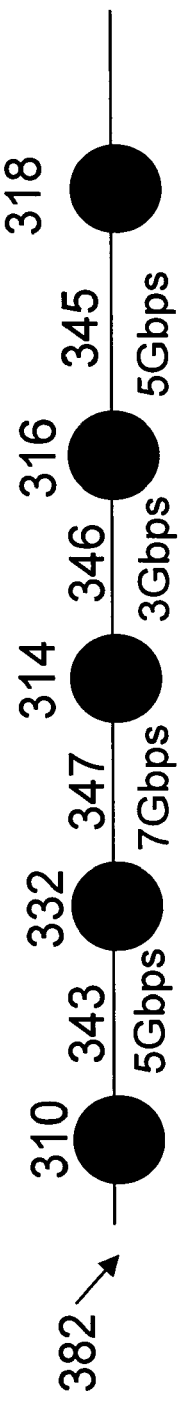
Figure 6H:
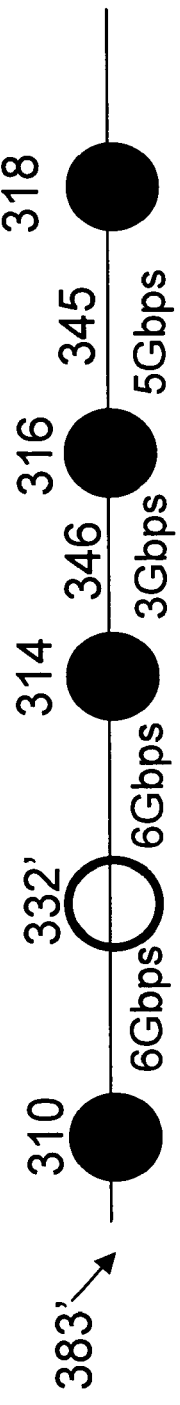
Figure 6I:
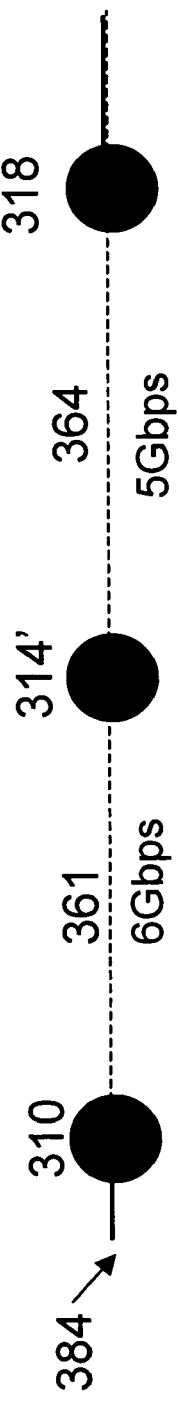
Figure 6P:
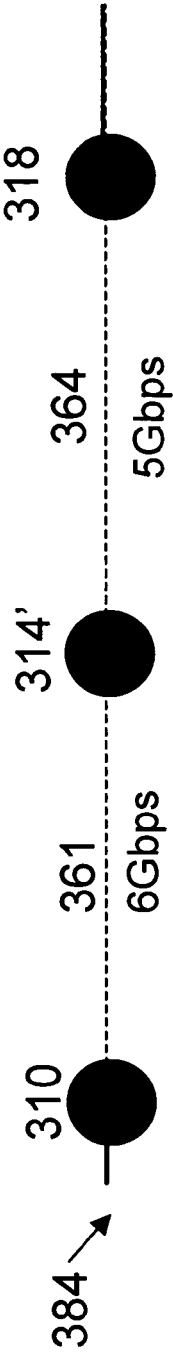
Figure 6Q:
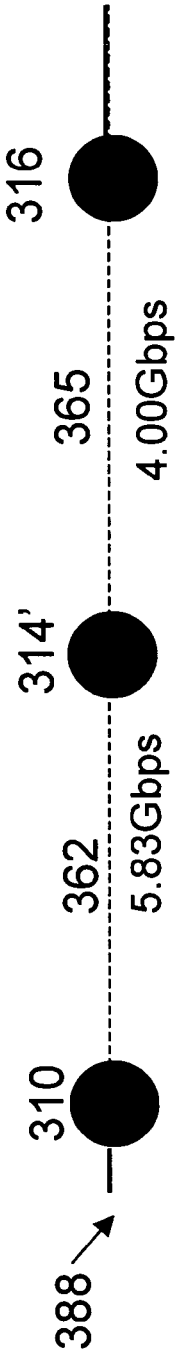
Figure 6R:
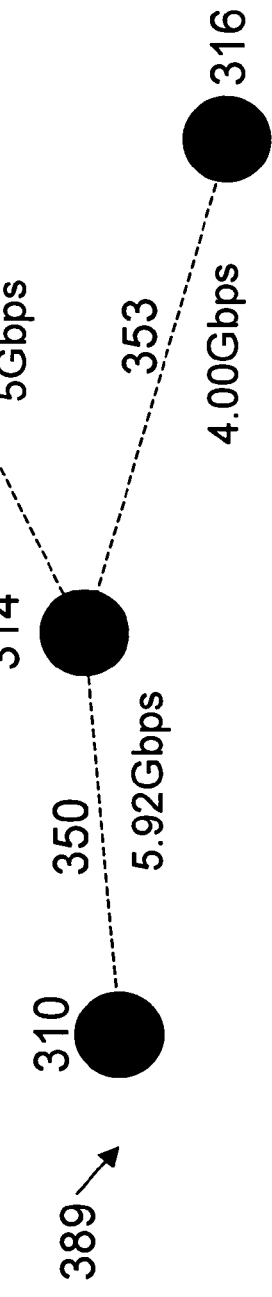

FIGS. 6F–6I illustrates the three paths from border node 310 to 318. FIG. 6F illustrates the first effective path 381', with nodes 310, 332, 314', 316', 318, through links 343 with bandwidths 5 Gbps and link averages 7 Gbps respectfully. FIG. 6G illustrates the second path 382, with nodes 310, 332, 314, 316, 318, through links 343, 347, 346, 345 with bandwidths 5 Gbps, 7 Gbps, 3 Gbps, 5 Gbps respectfully. FIG. 6H illustrates the third path 383', with nodes 310, 332', 314, 316, 318, through link averages 6 Gbps and links 346, 345 with bandwidths 3 Gbps and 5 Gbps respectfully. In at least one exemplary embodiment the virtual links 361 and 364, connected to intermediate phantom hub node 314', are assigned values associated with the average bandwidth along all three paths between nodes 310 and 314 or 314', 6 Gbps. Likewise the average, 5 Gbps, is used for virtual link 364. Although for the example the average bandwidth is used, other methods (e.g. link average, weighted average, and the like) can be used. Likewise FIGS. 6J–6N illustrate the derivation of virtual path 387' and the combination of virtual path 387' with path 385 and 386 into virtual path 388 in a similar fashion as described above for FIGS. 6F–6I.

The intermediate phantom hub node 314' along with associated virtual links 361, 362, 364, and 365 can be combined to form the properties advertised for phantom hub node 370 and associated virtual links 350, 353, and 354 forming a virtual network topology 389 (FIGS. 6O–6R). In the example shown the average bandwidth of virtual links 361 and 362 is used, 5.92 Gbps used for virtual link 350. The values of the virtual links 364 and 365 are used for the virtual links 354 and 353 respectfully, 5 Gbps and 4.00 Gbps. Again, although the average bandwidth is used in the example, the maximum, minimum and other variations are intended to fall within the scope of embodiments of the invention.

FIGS. 7A–7I is yet a further method in accordance with at least one exemplary embodiment. In this example paths between nodes that contain the particular node that is chosen to represent a phantom hub node are used. For example paths 481 (FIG. 7A), 482 (FIG. 7B), and 483 (FIG. 7C) are paths from node 310 to node 314, where 314 has been chosen to be associated with a phantom hub node 314'. In this example, the maximum through-put of the paths, 5 Gbps, from node 310 to node 314 is chosen to determine the virtual link value of virtual link 350 connecting node 310 with phantom hub node 314' (FIG. 7D), which in this example is also intra-domain node 314.

Figure 7A:
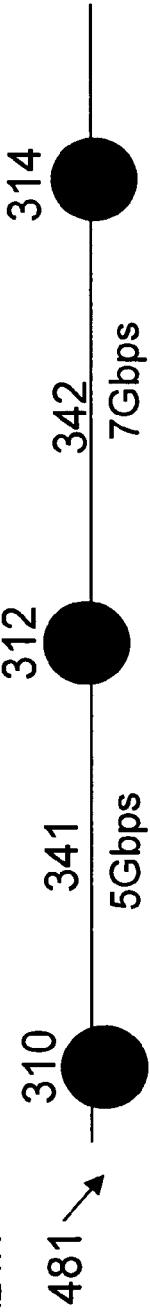
FIGS. 7A–7I illustrate at least one exemplary embodiment for determining virtual link values to form a virtual network topology, where the phantom hub node is associated with an intra-domain node.
Figure 7B:
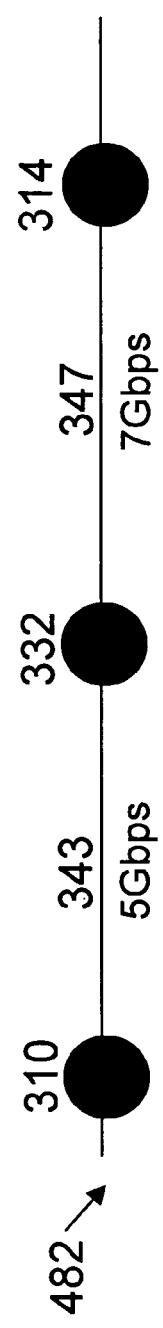
Figure 7C:
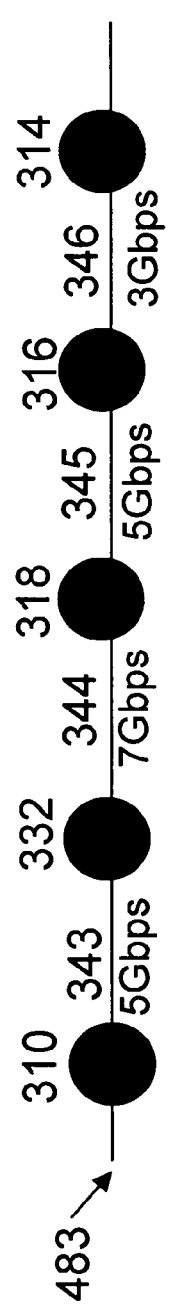
Figure 7D:
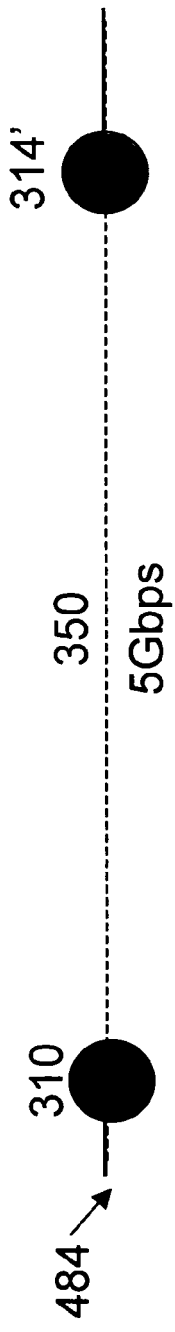
Figure 7E:
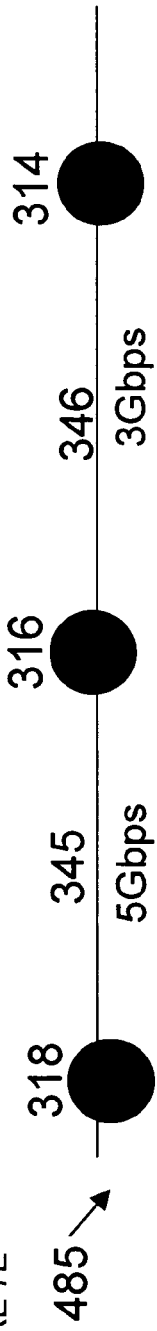
Figure 7F:
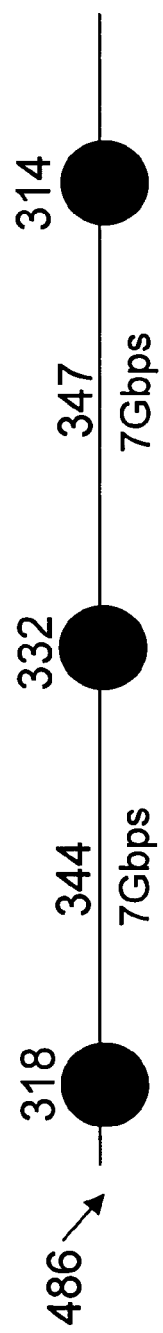
Figure 7G:
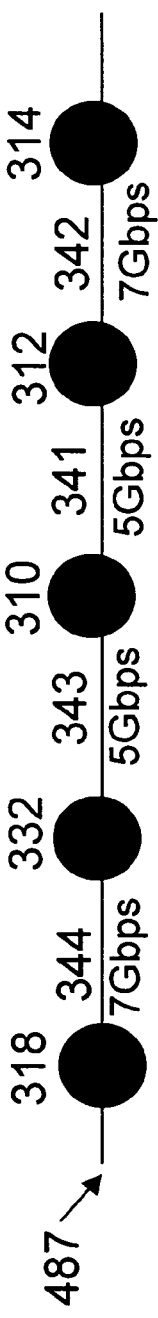
Figure 7H:
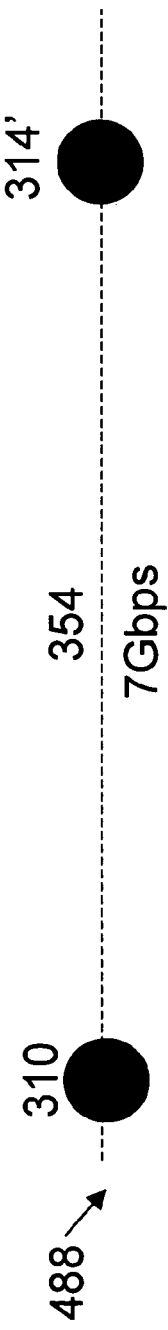
Figure 7I:
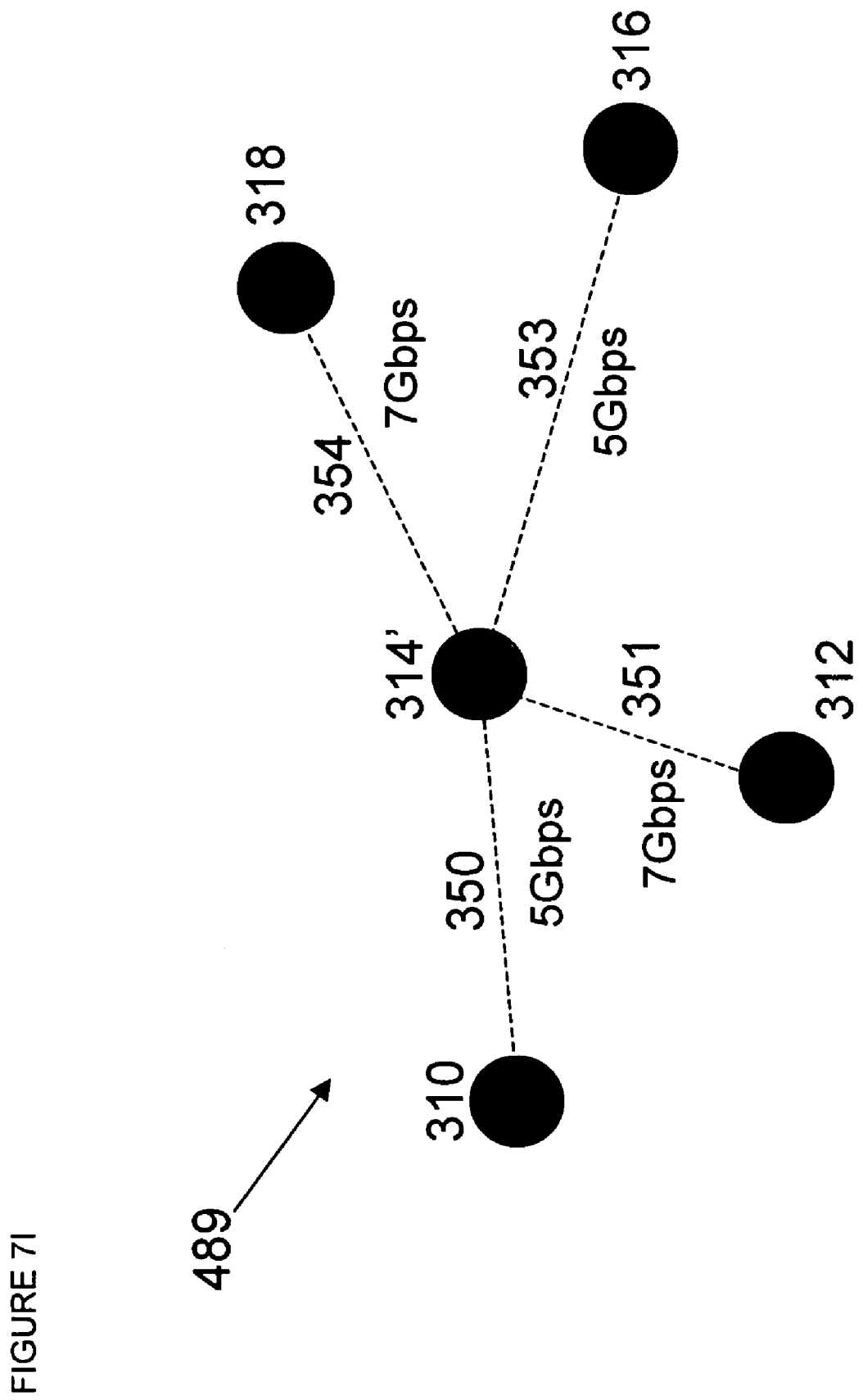

Similarly paths 485 (FIG. 7E), 486 (FIG. 7F), and 487 (FIG. 7G) are paths between node 318 and node 314. As above, using the maximum through-put, the virtual link value of 7 Gbps is chosen to determine the virtual link value of virtual link 354 connecting node 318 and the phantom hub node 314' (node 314). The virtual link values associated with virtual links 351 and 353 (FIG. 7I) can be determined in a similar manner and the resulting virtual network topology 489 is illustrated in FIG. 7I. Note that since node 314 is associated with the phantom hub node, virtual link 352 need not be determined.

Further, even though a physical node (e.g., 314) is used as the phantom hub node, the other methods for generating a phantom hub node and related virtual links described herein are applicable to this embodiment. However, those skilled in the art will appreciate that the link connecting the intra-domain node (e.g., border node 314) does not need to be generated or advertised. For example, a predetermined virtual link value can be used to represent connectivity (e.g., links 350–354) to the phantom hub node 314' (node 314), thereby allowing additional nodes to be added with minimal computational effort.

Accordingly, at least one embodiment of the invention includes a system for advertising a representation of a domain (e.g., a domain can be considered to be an arbitrary network of interconnected network elements/nodes). The system comprises a first virtual link, a second virtual link, and at least one phantom hub node. The phantom hub node is coupled to a first intra-domain node by the first virtual link and coupled to a second intra-domain node by the second virtual link. The first and second virtual links can be determined based on characteristics of the domain, as discussed in the foregoing description. A first virtual link value and a second virtual link value are associated with the first virtual link and the second virtual link, respectively, and can be determined as discussed herein.

Figure 8:
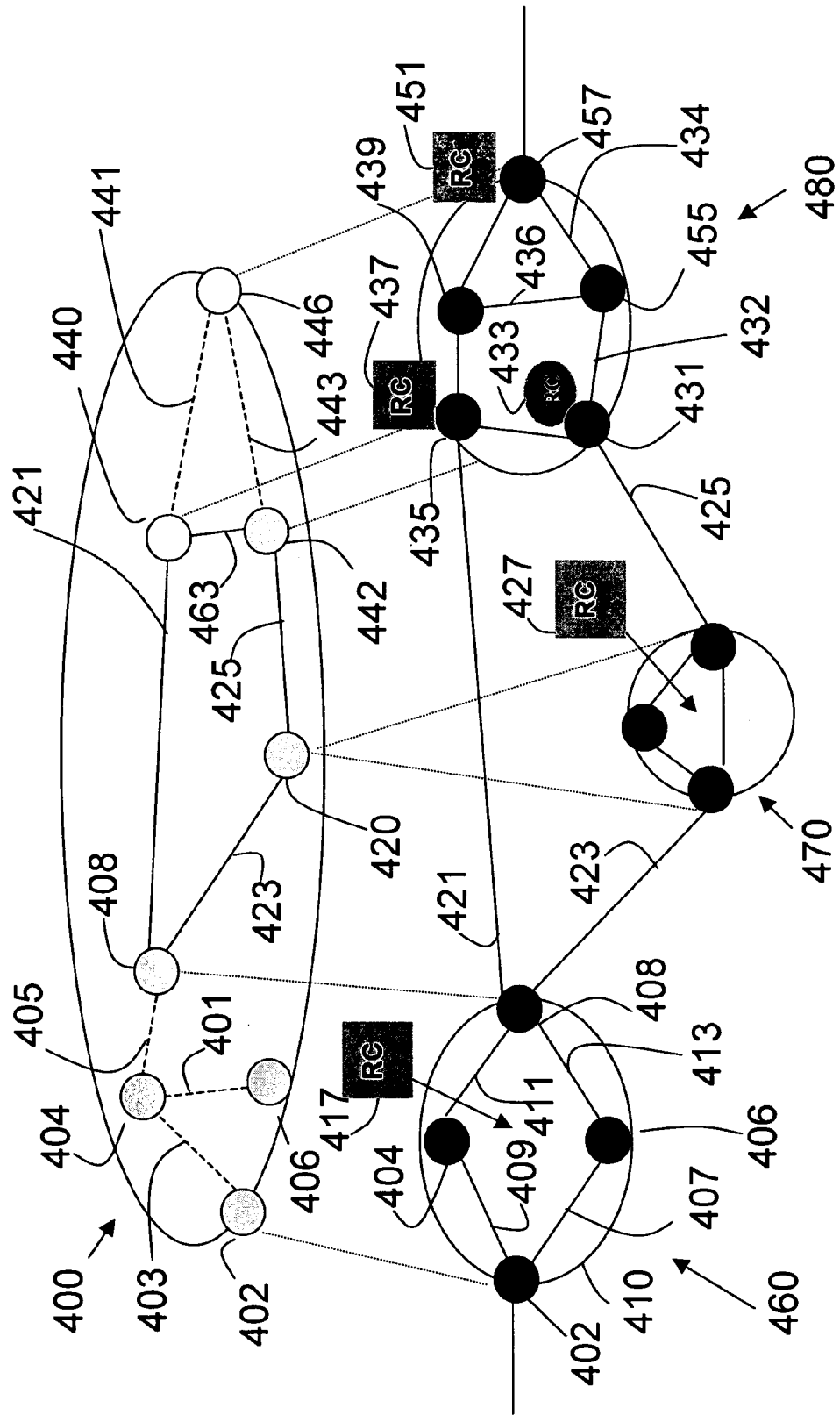
FIG. 8 is an illustration of using virtual network topologies to represent portions of actual intra-domain node(s) and links in accordance with at least one exemplary embodiment.

Referring to FIG. 8, at least one further exemplary embodiment uses abstracted intra-domain virtual links (e.g., 401, 403, 405, 441 and 443) for portions of an intra-domain network topology. As discussed above intra-domain nodes and physical links can be replaced by phantom hub nodes and virtual links between intra-domain nodes. The intra-domain nodes can be border nodes. FIG. 8 illustrates a representative inter-domain topology. As illustrated, there are one or more routing controllers (RCs) per domain, e.g., 417, 427, 433, 437, 451, which can be considered nodes in the control plane. The routing controllers serve to relay advertisements from external nodes or networks into the subject network (e.g., 400), and generate advertisements of the subject network topology to send to external nodes or networks. Nodes 402, 404, 406, 408, 420, 440, 442, and 446 are connected by intra-domain links (e.g., 421, 423, 425, 463). Nodes (e.g. 402, 404, 406, 408, 431, 435, 439, 455, 457, and the like) representing portions of the network (460, 470, 480, and the like) can be represented as nodes and virtual links (e.g. nodes 402, 404, 406 and virtual links 401, 403, 405, and 470 represented by a single virtual node 420, and the like). For example, portion 460 can be abstract traffic-engineering (TE) links with centralized routing control 470 can be an abstract or virtual node with centralized routing control and 480 can be an abstract TE links with distributed routing control. Each of the portions 460, 470, and 480 can be considered domains, with the possibility that each domain can be represented by a virtual network topology as described above. As illustrated, the domain 460 can be represented by the virtual network topology composed of nodes 402, 406, 408; virtual links 401, 403, 405; and phantom hub node 404.

At least one exemplary embodiment employs different options for deployment of the RCs and derivation of the abstract (virtual) topology. For example, a single RC can be used per network. each border node could have RC functionality. Further, combinations of sub-networks with single and/or multiple RC's per sub-network can be used. Further, the virtual topology could be derived from knowledge of the physical network topology (as can be provided through the use of a link state routing protocol within the subject network) and/or from advertisements generated by each border node.

In at least one exemplary embodiment of the invention, each border node can generate at least one phantom hub node (e.g., using techniques described above) and advertise one-way link capacity both to and from the phantom hub node(s). These advertisements can be received by all other border nodes and can be used to define the overall virtual network topology to be advertised to a connected external node or network.

In at least one exemplary embodiment of the invention, each border node can derive the presence of links from the phantom hub node(s) to other border nodes based on knowledge of the physical topology of the subject network. For example, the knowledge of the physical topology of the subject network can include a set of border nodes in the subject network, and the ability to reach any border node X from any other border node Y (e.g., border node 310 to border node 316 in FIG. 3). Thus, further exemplary embodiments do not require the communication of the topology of virtual links and phantom hub nodes between the various border nodes, instead each border node can derive the virtual topology and phantom hub node by itself.

Those skilled in the art will appreciated that other alternatives exist to generating the at least one phantom hub node, such as a central processor could generate the phantom hub node based on the known physical topology of the network or portion of the network. Additionally, as discussed above the phantom hub node can be assigned to a specific node in the network, such as one of the border nodes. Further, predetermined virtual link value(s) can be established between the at least a subset of the intra-domain nodes and phantom hub node (e.g., in the case of a VPN discussed above).

Figure 9:
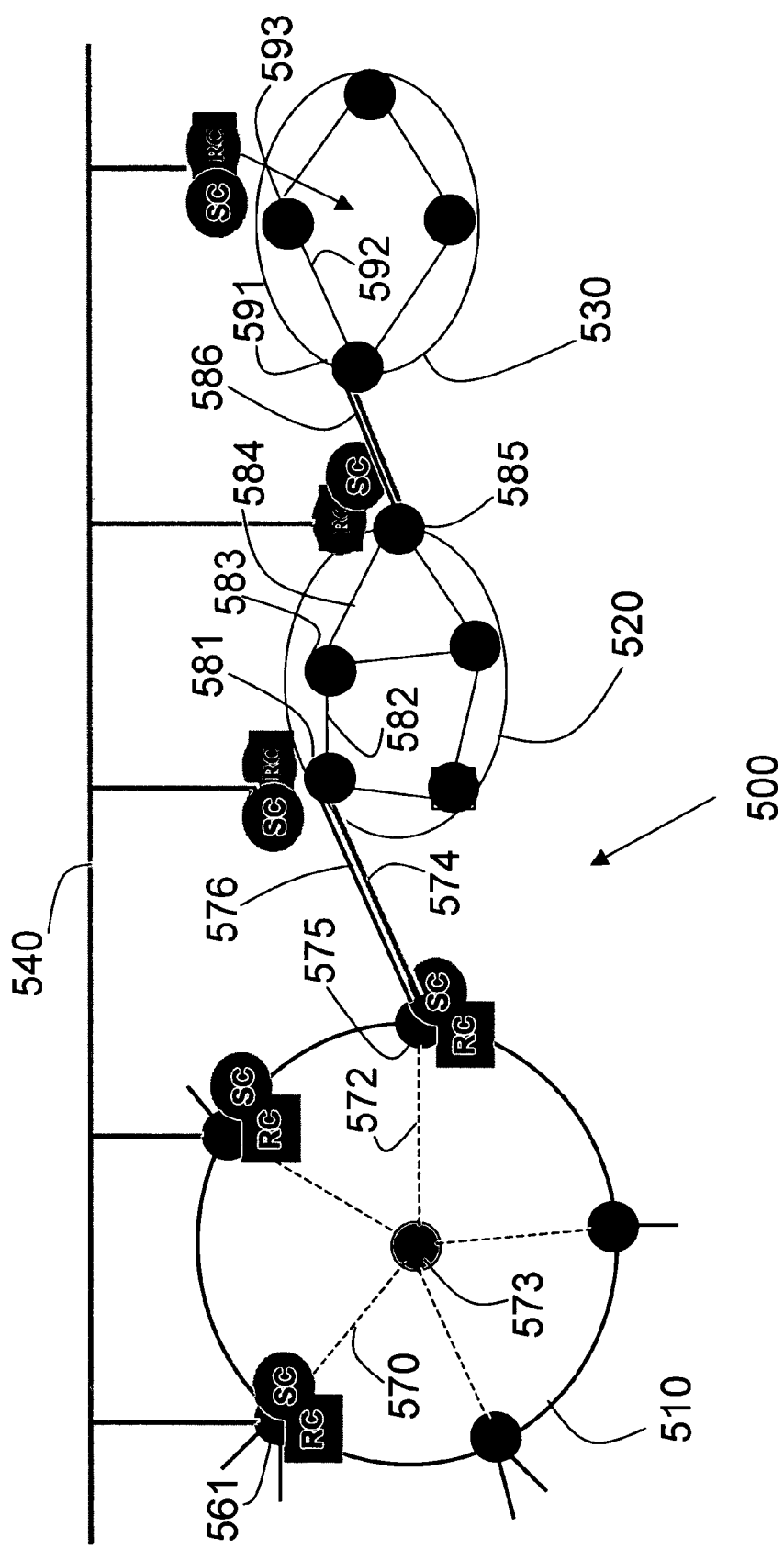
FIG. 9 is an illustration of a virtual network topology, which receives and/or transmits data amongst domains in accordance with at least one exemplary embodiment.

FIG. 9 illustrates the use of a virtual network topology of domain 510, which receives and/or transmits data between domains 510, 520, and 530 in accordance with at least one exemplary embodiment in a communication network 500. Domain 510 represents a virtual network topology comprising a phantom hub node 573 in a star connectivity pattern with border nodes (e.g. 561, 575, and the like) and virtual links (e.g. 570, 572, and the like). To transmit data from the originating node 561 to domain 530, Explicit Route Objects (ERO) can be generated through the path of 561, phantom hub node 573, border node 575, through nodes 581, 583, 585 to node 591. Likewise a ERO from domain 530 to 510 can have a path of 591, 585, 583, 581, 575, 573 and 561. Control channel 574 and 540 communicates the routing and signaling information between domains 510, 520, and 530. However, when the data is actually transmitted through domain 510, node 573 will typically be skipped, since it is a phantom node and internal routing data base containing the physical nodes and links will be used to route through domain 570. Outside domain 510, the routing control and signal control routes the data through inter-domain link 576, node 581, link 582, node 583, link 584, and node 585. The data is passed along inter-domain link 586 to node 591, to domain 530. Each domain can have various protocols and structures. Accordingly, the invention is not limited to the particular examples described herein.

Figure 10:
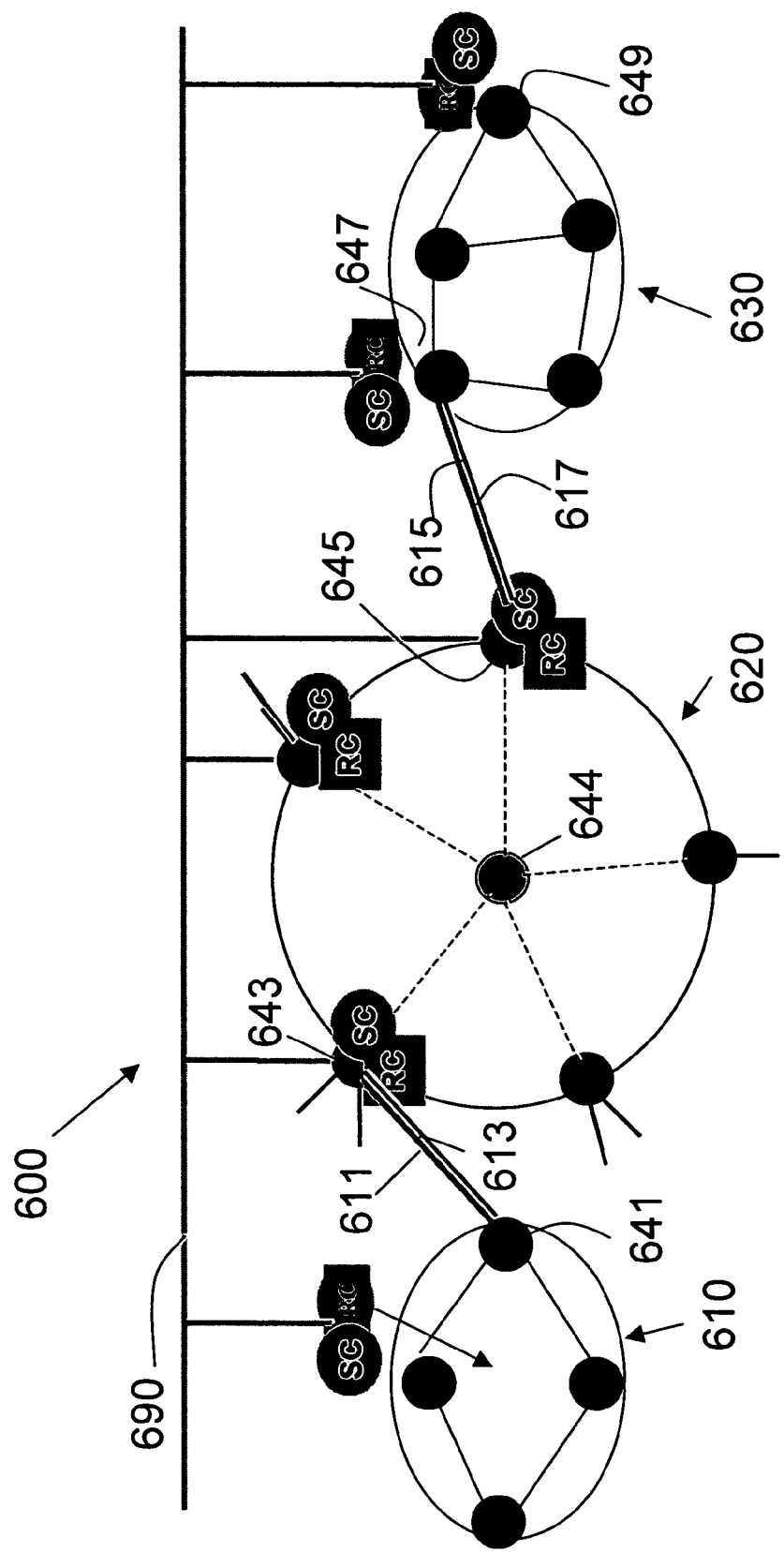
FIG. 10 is a further illustration of a virtual network topology in at least another exemplary embodiment, which receives and/or transmits data amongst domains.

FIG. 10 illustrates the use of a virtual network topology of domain 620, which passes data from domain 610 through the virtual network topology 620 to domain 630. The originating domain 610 generates an ERO to reach domain 620 via nodes 641, 643, phantom node 644, 645, and 647. Node 641 can pass data along inter-domain link 613 to border node 643 of domain 620. The data is routed to its border node 645 of domain 620 via the physical links and nodes interconnecting border node 643 and 645 in domain 620. Once again, phantom node 644 is typically not used (unless the phantom node is assigned to a physical node such as a border node used in the path). Border node 645 obtains routing and signaling information from domain 630 via control channels 690 and 615. The data is then passed along inter-domain link 617 to border node 647 which then uses routing information of domain 630 to route the data to the designation node 649. Each domain can have various protocols and structures and the originating and designation nodes can be intra-domain nodes and/or border nodes.

FIG. 11 illustrates a flow chart illustrating another exemplary embodiment of the invention. As illustrated in accordance with at least one exemplary embodiment of the invention, a phantom hub node is instantiated, in block 710 and virtual link values are determined, in block 720. For example, a first virtual link value is determined that represents connectivity between a first intra-domain node and the phantom hub node. Likewise, a second virtual link value is determined that represents connectivity between a second intra-domain node and the phantom hub node. As discussed above, the first and second virtual link values can be determined based on the link characteristics of the domain and/or at least one predetermined virtual link value. Each virtual link can use the same value or more than one predetermined value can be established and assigned to different virtual links. Further, the different virtual links can be to/from the same node to different phantom hub nodes. For example, a first virtual link to/from a first phantom hub node and a first border node can be generated using a first predetermined virtual link value. For example, the first predetermined virtual link value can be established by a service level agreement, such as in a VPN network. Additionally, a second virtual link connecting the first border node to a second phantom hub can be used to advertise a virtual topology of the domain to external networks. The second virtual link can be generated using a second predetermined value or any of the other methods described herein.

In at least one exemplary embodiment a representation of the domain (e.g., virtual network topology including the virtual link value) is advertised, in block 730. As discussed above, the physical network topology can be represented by both a virtual network topology and a portion of the physical network topology not represented by the virtual network topology. Accordingly, the representation advertised is not limited to the virtual values and at least one embodiment of the invention can include advertising representations of a domain containing both virtual and a at least part of the physical topology not represented.

An example of instantiating a phantom hub node comprises each border node generating at least one intermediary phantom hub node, advertising a one-way link capacity both to and from the intermediary phantom hub node. The advertisements are received at the border nodes and are used to define an overall virtual network topology including the phantom hub node. Alternatively, instantiating the phantom hub node can comprise determining (by at least one border node) virtual links from the phantom hub node to other border nodes based on knowledge of the physical topology of the domain. Accordingly, each border node can generate a virtual network topology using the methods described herein and advertise the virtual network topology to external networks or nodes.

Further embodiments can additionally instantiate a second phantom hub node, where the second phantom hub node connects with less than all of the border nodes. In addition to instantiating the phantom hub nodes, embodiments can also advertise the first and second virtual link values to at least one of an external domain, network, and node, such as a border node.

The invention has been described in connection with a number of exemplary embodiments. To facilitate an understanding of the invention, many aspects of the invention were described in terms of sequences of actions. In at least one exemplary embodiment some actions can be performed by elements of a processor. Additionally, it will be recognized that in at least some embodiments, the various actions could be performed by specialized circuits (e.g., discrete logic gates interconnected to perform a specialized function, application specific integrated circuits (ASICS), and the like), by program instructions or computer program code being executed by one or more processors, or by a combination of both.

Moreover, at least one exemplary embodiment can be considered to be embodied entirely within any form of a computer readable storage medium having stored therein an appropriate set of computer instructions that would cause a processor to carry out the techniques described herein. Thus, the exemplary embodiment may be in tangible media, such as a floppy diskette, CD, DVD, hard drive, flash disk, magnetic tape, memory or any other computer-readable storage medium, wherein, when the program code is loaded into and executed by a processor, the processor becomes an apparatus for practicing an embodiment of the invention. Additionally, embodiments can include program instructions as a data signal transmitted via a transmission medium, such as over electrical wiring or cabling, through fiber optics, or via electromagnetic radiation, wherein, when the computer program code is loaded into and executed by a processor, the processor becomes an apparatus for practicing the embodiment of the invention. Accordingly, various aspects of the invention can be embodied in many different forms, and all such forms are contemplated to be within the scope of the invention. For some of the various aspects of the invention, some such forms of an embodiment can be referred to herein as "logic configured to", "module configured to", and/or "logic that" performs a described action.

Accordingly, at least one embodiment of the invention includes an apparatus comprising logic configured to generate a phantom hub node, logic configured to determine a first virtual link value, and logic configured to determine a second virtual link value. The virtual link values represent connectivity between the represented intra-domain nodes (e.g., border nodes) and the phantom hub node. The virtual link values can be determined based on characteristics of the domain (e.g., the physical topology, physical link parameter (e.g. bandwidth), and the like). Alternatively, the virtual link values can be determined using at least one predetermined virtual link value. For example, the predetermined virtual link value can be set for all links connecting intra-domain nodes (e.g., border nodes) to the phantom hub node. The predetermined virtual link value can be based on a service level agreement, such as related to a VPN service, or another value established by a network operator (e.g., minimum bandwidth, protection level, and the like) wherein the values are compatible with LSA's used in to represent the physical network. Further, the apparatus can further include logic configured to advertise the virtual link values to at least one of an external domain, network, and node.

Those skilled in the art will appreciate that the logic that forms the apparatus can be realized in variety of configurations, as discussed above. Accordingly, the apparatus can be realized in various network elements alone or in combination with other network elements. For example, the apparatus can be at least one of a routing controller (RC), a border node (or other intra-domain node), a sub-network, central processor, and the like. As discussed above, a single RC per network can be used. Alternatively, each border node could have RC functionality. Further, combinations of sub-networks with single and/or multiple RC's per sub-network can be used.

Other embodiments of the apparatus can include each border node including logic configured to generate at least one intermediary phantom hub node, logic configured to advertise one-way link capacity to/from the at least one intermediary phantom hub node, and logic configured to receive the advertisements from other border nodes and to use the advertisements to define an overall virtual network topology including at least one phantom hub node. Alternatively, embodiments can include at least one border node including logic configured to derive virtual links from the phantom hub node to other border nodes based on knowledge of the physical topology of the domain. Typically, intelligent nodes in a network will have information regarding the physical topology of the domain, which can be communicated to and stored at the node using known methods in the art.

In the exemplary examples herein, the term phantom hub node is used, where a phantom hub node is a type of virtual node. The scope of exemplary embodiments is intended to include virtual nodes. Thus the examples using phantom hub nodes are intended to apply for virtual nodes as well. For example, a virtual node can be use in cases where only some of the virtual links have a virtual node in common but not all. In at least one exemplary embodiment, a phantom hub node is a virtual node that is common to all virtual links connecting at least a portion of the intra-domain nodes. In this example if a portion of the intra-domain nodes connect via a phantom hub node, the remaining intra-domain nodes can connect via virtual links associated with separate virtual nodes, where not all of the virtual links forming a virtual network topology have the phantom hub node in common. Additionally, a virtual network topology can have a virtual node that is one or more of the physical nodes in the intra-domain topology.

Further exemplary embodiments can include reducing a first portion of a domain (e.g., physical network of interconnected nodes) into a virtual network topology, while a second portion represents a portion of the domain (e.g., physical network) not represented by the virtual network topology. In at least one exemplary embodiment the virtual network topology and the second portion are both advertised. Thus, a virtual network can represent sensitive portions of a physical network, while non-sensitive portions can be represented by their physical topology (e.g., link values and nodes).

The foregoing description of the invention is merely exemplary in nature. Accordingly, it should be appreciated that variations to those embodiments can be made by those skilled in the art without departing from the scope of the invention as defined by the following claims.

What is claimed is:

1. A system for advertising a representation of a domain comprising:
   a first virtual link;
   a second virtual link; and
   at least one phantom hub node coupled to a first intra-domain node by the first virtual link and coupled to a second intra-domain node by the second virtual link, wherein the first and second virtual links are determined based on characteristics of the domain, and
   wherein first and second virtual link values are associated with the first and second virtual links, respectively, and are determined based on at least one of link characteristics of the domain and at least one predetermined virtual link value.

2. The system of claim 1, wherein the at least one predetermined virtual link value is established by a service level agreement.

3. The system of claim 1, wherein the link characteristic of the domain is a minimum bandwidth of the physical links interconnecting border nodes in the domain.

4. The system of claim 1, wherein the first virtual link value is determined to be one of the minimum bandwidth, the average bandwidth, and the sum of the bandwidths of at least two physical links connected to the first intra-domain node.

5. The system of claim 1, further comprising:
   a third intra-domain node coupled to the phantom hub node by a third virtual link, wherein a third virtual link value is associated with the third virtual link, respectively, and is determined based on at least one of physical link characteristics of the domain and at least one predetermined virtual link value.

6. The system of claim 5, wherein the system is a star connectivity pattern between the at least one phantom hub node and the first, second, and third intra-domain nodes.

7. The system of claim 5, wherein at least one of the intra-domain nodes is a border node.

8. The system of claim 5, wherein all the intra-domain nodes connected to the phantom hub node are border nodes.

9. The system of claim 5, wherein there are at least two phantom hub nodes, wherein a first phantom hub node connects with all border nodes in a star connectivity pattern, and wherein a second phantom hub node connects with less than all of the border nodes.

10. The system of claim 5, further comprising:
    a network element, configured to advertise the first, second, and third virtual link values to at least one of an external domain, network, and node.

11. The system of claim 10, wherein the network element is at least one of a border node, routing controller, and central processor.

12. The system of claim 1, further comprising:
    a network element configured to advertise the first and second virtual link values to at least one of an external domain, network, or node.

13. A system for advertising a representation of a domain comprising:
    a first virtual link;
    a second virtual link; and
    at least one phantom hub node coupled to a first intra-domain node by the first virtual link and coupled to a second intra-domain node by the second virtual link, wherein the first and second virtual links are determined based on characteristics of the domain,
    wherein the representation of the domain includes less than all of a physical network topology of the domain.

14. A method of representing a domain comprising:
    instantiating a phantom hub node;
    determining a first virtual link value representing connectivity between a first intra-domain node and the phantom hub node; and
    determining a second virtual link value representing connectivity between a second intra-domain node and the phantom hub node, wherein the first and second virtual link values are determined based on at least one of link characteristics of the domain and at least one predetermined virtual link value.

15. The method of claim 14, wherein the predetermined virtual link value is established by a service level agreement.

16. The method of claim 14, wherein the link characteristic of the domain is a minimum bandwidth of the physical links interconnecting border nodes in the domain.

17. The method of claim 14, wherein the first virtual link value is determined to be one of the minimum bandwidth, the average bandwidth, and the sum of the bandwidths of at least two physical links connected to the first intra-domain node.

18. The method of claim 14, further comprising:
    determining a third virtual link value representing connectivity between a third intra-domain node and the phantom hub node.

19. The method of claim 18, wherein all the intra-domain nodes connected to the phantom hub node are border nodes.

20. The method of claim 14, further comprising:
    instantiating a second phantom hub node, wherein the second phantom hub node connects with less than all of the border nodes.

21. The method of claim 14, further comprising:
    advertising the first and second virtual link values to at least one of an external domain, network, and node.

22. The method of claim 14, wherein instantiating the phantom hub node comprises:
    each border node generating at least one intermediary phantom hub node;
    advertising one-way link capacity both to and from the at least one intermediary phantom hub node; and
    receiving the advertisements at the border nodes and using the advertisements to define an overall virtual network topology including at least one phantom hub node.

23. The method of claim 14, wherein instantiating the phantom hub node comprises:
    determining, by at least one border node, virtual links from the phantom hub node to other border nodes based on knowledge of the physical topology of the domain.

24. An apparatus comprising:
    logic configured to generate a phantom hub node;
    logic configured to determine a first virtual link value representing connectivity between a first border node and the phantom hub node; and
    logic configured to determine a second virtual link value representing connectivity between a second border node and the phantom hub node, wherein the first and second virtual link values are determined based on at least one of link characteristics of the domain and at least one predetermined virtual link value.

25. The apparatus of claim 24, further comprising:

logic configured to determine a third virtual link value representing connectivity between a third intra-domain node and the phantom hub node.

26. The apparatus of claim 25, wherein all the intra-domain nodes connected to the phantom hub node are border nodes.

27. The apparatus of claim 24, further comprising:

logic configured to advertise the first and second virtual link values to at least one of an external domain, network, and node.

28. The apparatus of claim 24, wherein each border node comprises:

logic configured to generate at least one intermediary phantom hub node;

logic configured to advertise one-way link capacity both to and from the at least one intermediary phantom hub node; and logic configured to receive the advertisements from other border nodes and to use the advertisements to define an overall virtual network topology including at least one phantom hub node.

29. The apparatus of claim 24, wherein at least one border node comprises:

logic configured to derive virtual links from the phantom hub node to other border nodes based on knowledge of the physical topology of the domain.

30. The apparatus of claim 24, wherein the apparatus is at least one of a routing controller, an intra-domain node, a border node, central processor and a sub-network.

* * * * *